US012665100B2

(12) United States Patent
Crichlow

(10) Patent No.: US 12,665,100 B2
(45) Date of Patent: Jun. 23, 2026

(54) URANIUM HEXAFLUORIDE BYPRODUCTS AND/OR MATERIALS DISPOSAL

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 873 days.

(21) Appl. No.: 17/883,409

(22) Filed: Aug. 8, 2022

(65) Prior Publication Data

US 2023/0020410 A1 Jan. 19, 2023

Related U.S. Application Data

(63) Continuation-in-part of application No. 17/243,491, filed on Apr. 28, 2021, now Pat. No. 12,162,051, and
(Continued)

(51) Int. Cl.
| | |
|---|---|
| *G21F 9/30* | (2006.01) |
| *B09B 1/00* | (2006.01) |
| *B09B 3/35* | (2022.01) |
| *B65G 5/00* | (2006.01) |
| *G21F 9/34* | (2006.01) |

(52) U.S. Cl.
CPC ............... *G21F 9/30* (2013.01); *B09B 1/008* (2013.01); *B09B 3/35* (2022.01); *B65G 5/00* (2013.01); *G21F 9/34* (2013.01)

(58) Field of Classification Search
CPC .... G21F 9/30; G21F 9/34; B09B 3/35; B65G 5/00
See application file for complete search history.

(56) References Cited

U.S. PATENT DOCUMENTS

| | | | | |
|---|---|---|---|---|
| 4,192,765 A | | 3/1980 | Bird | |
| 4,906,135 A | * | 3/1990 | Brassow | ................... B09B 3/20 |
| | | | | 405/129.55 |

(Continued)

FOREIGN PATENT DOCUMENTS

| | | | | |
|---|---|---|---|---|
| DE | 3007876 | * | 9/1981 | ............. G21C 19/34 |
| DE | 102010017201 A1 | | 9/2011 | |

OTHER PUBLICATIONS

Bulko, et al. "Recovery of high value fluorine products from uranium hexafluoride conversion." WMâ99 Conf. 1999 (Year: 1999).*
(Continued)

*Primary Examiner* — Anthony J Zimmer
*Assistant Examiner* — Eric Scott Sherman
(74) *Attorney, Agent, or Firm* — Eric Kelly

(57) ABSTRACT
A method of disposing of uranium oxides and of disposing of metal casks that had formerly held uranium hexafluoride may include steps of: (a) receiving at least a quantity of at least one type of uranium oxide; (b) receiving at least one metal cask selected from the metal casks that was formerly housing at least some quantity of the uranium hexafluoride; (c) cutting up and/or shredding the at least one metal cask into smaller pieces; and (d) loading at least some of the quantity of the at least one type of uranium oxide and/or loading at least some of the smaller pieces into one or more human-made caverns. The one or more human-made caverns may be located within at least one deeply located geologic (rock) formation. The at least one deeply located geologic (rock) formation may be located at least 2,000 feet vertically below a terrestrial surface of the Earth.

23 Claims, 15 Drawing Sheets

Related U.S. Application Data a continuation-in-part of application No. 17/103,641, filed on Nov. 24, 2020, now Pat. No. 11,508,489.

(56)  References Cited

U.S. PATENT DOCUMENTS

| | | | | |
|---|---|---|---|---|
| 5,171,483 | A | * | 12/1992 | Tollison, Jr. ............... G21F 9/34 |
| | | | | 405/129.55 |
| 5,358,047 | A | | 10/1994 | Himes |
| 5,835,548 | A | | 11/1998 | Lindgren |
| 6,547,871 | B2 | | 4/2003 | Chatterjl |
| 6,941,883 | B2 | | 9/2005 | Nguyen |
| 6,951,249 | B1 | | 10/2005 | Chatterjl |
| 7,008,477 | B2 | | 3/2006 | Chatterjl |
| 7,191,834 | B2 | | 3/2007 | Lewis |
| 8,030,253 | B2 | | 10/2011 | Roddy |
| 8,287,640 | B2 | | 10/2012 | Zamora |
| 8,592,352 | B2 | | 11/2013 | Karcher |
| 9,725,368 | B2 | | 8/2017 | Enzenhofer |
| 10,427,191 | B2 | | 10/2019 | Crichlow |
| 10,807,132 | B2 | | 10/2020 | Crichlow |
| 10,943,706 | B2 | | 3/2021 | Muller |
| 11,158,434 | B2 | | 10/2021 | Payer |
| 11,183,313 | B2 | | 11/2021 | Crichlow |
| 2004/0025560 | A1 | * | 2/2004 | Funakoshi ............... B21C 1/26 |
| | | | | 72/358 |
| 2007/0290149 | A1 | | 12/2007 | Wichland |
| 2019/0295735 | A1 | | 9/2019 | Crichlow |
| 2020/0273591 | A1 | * | 8/2020 | Muller ................... G21F 5/008 |

OTHER PUBLICATIONS

RamebÃ¤ck, et al. "Transport and leaching of technetium and uranium from spent $UO_2$ fuel in compacted bentonite clay." Journal of Nuclear Materials 277.2-3 (2000): 288-294 (Year: 2000).*

* cited by examiner

| Activity | Paducah | | Portsmouth | |
| --- | --- | --- | --- | --- |
| | No Action Alternative | Disposal Alternatives | No Action Alternative | Disposal Alternatives |
| Evaluated in the 2004 EISs (DOE 2004a, 2004b) but not Evaluated in this *DU Oxide SEIS*a | | | | |
| Conversion of DUF₆ to DU Oxide | | | | |
| Start of Conversion Operations | 2011 | | 2011 | |
| Duration of Conversion Operations | 34 to 44 years[b] | | 22 to 32 years[b] | |
| Evaluated in this *DU Oxide SEIS* | | | | |
| Amount of DU Oxide | 446,515 MT | | 199,337 MT | |
| DU Oxide in Cylinders[c] | 46,150 cylinders | | 22,850 cylinders | |
| DU Oxide in Drums | 220 drums | | 365 drums | |
| (d)<br><br>Disposal of CaF₂ | 379,000 MT | | 159,000 MT | |
| Disposal of Empty and Heel Cylinders | 8,483 cylinders | | 5,517 cylinders | |
| Start of DU Oxide Storage | 2011 | | 2011 | |
| Storage of DU Oxide Containers | 100 years[e] | 76 years[f] | 100 years[e] | 47 years[f] |
| Employment Associated with DU Oxide<br><br>Container Storage | 16 FTEs | | 12 FTEs | |
| Transport of DU Oxide Containers to Off-site Disposal Facilities | NA | 32 years [g] | NA | 15 years [g] |
| Disposal of DU Oxide at Energy*Solutions*, NNSS, or WCS | NA | 258,000 cubic yards | NA | 128,000 cubic yards |

Table 1

FIG. 1A (Prior Art)

| Compound | Melt Pt. °C | Bulk Density | Solubility in Water |
|---|---|---|---|
| $UF_6$ | 64.1 | 4.6 | Decomposes to $UO_2F_2$ |
| $UF_4$ | 960 | 2.0-5.0 | Slight |
| $UO_2F_2$ | 300 | 2.6 | Soluble |
| $U_3O_8$ | 1,300 | 1.5 - 4.0 | Insoluble |
| $UO_2$ | 2,878 | 2.0 - 5.0 | Insoluble |
| Uranium | 1,132 | 19 | Insoluble |

Table 2 – Physical Properties of Uranium Compounds

| CAVERN | WEIGHT OF URANIUM OXIDE IN CAVERN - LBS | | | | |
| | 156  LB/FT3 | | | 2.50  GM/CC | |
| | CAVERN DIAMETER - INCHES | | | | |
| LENGTH | 36 | 48 | 60 | 72 | 84 |
| 1,000 | 1,102,699 | 1,960,354 | 3,063,053 | 4,410,796 | 6,003,584 |
| 1,400 | 1,543,779 | 2,744,495 | 4,288,274 | 6,175,115 | 8,405,017 |
| 1,800 | 1,984,858 | 3,528,637 | 5,513,495 | 7,939,433 | 10,806,450 |
| 2,200 | 2,425,938 | 4,312,778 | 6,738,716 | 9,703,751 | 13,207,884 |
| 2,600 | 2,867,017 | 5,096,920 | 7,963,937 | 11,468,070 | 15,609,317 |
| 3,000 | 3,308,097 | 5,881,061 | 9,189,159 | 13,232,388 | 18,010,751 |
| 3,400 | 3,749,177 | 6,665,203 | 10,414,380 | 14,996,707 | 20,412,184 |
| 3,800 | 4,190,256 | 7,449,345 | 11,639,601 | 16,761,025 | 22,813,618 |
| 4,200 | 4,631,336 | 8,233,486 | 12,864,822 | 18,525,344 | 25,215,051 |
| 4,600 | 5,072,415 | 9,017,628 | 14,090,043 | 20,289,662 | 27,616,484 |

Table 3

FIG. 7B

URANIUM HEXAFLUORIDE BYPRODUCTS AND/OR MATERIALS DISPOSAL

PRIORITY NOTICE

The present patent application is a continuation-in-part (CIP) of U.S. non-provisional patent application Ser. No. 17/103,641 filed on Nov. 24, 2020, and claims priority to said U.S. non-provisional patent application under 35 U.S.C. § 120. The above-identified patent application is incorporated herein by reference in its entirety as if fully set forth below.

The present patent application is a continuation-in-part (CIP) of U.S. non-provisional patent application Ser. No. 17/243,491 filed on Apr. 28, 2021, and claims priority to said U.S. non-provisional patent application under 35 U.S.C. § 120. The above-identified patent application is incorporated herein by reference in its entirety as if fully set forth below.

CROSS REFERENCE TO RELATED PATENT APPLICATIONS

This present U.S. non-provisional patent application is related to previously filed and pending U.S. non-provisional patent applications by the same inventor related to the disposal of nuclear waste material in deep underground formations, wherein these related U.S. non-provisional patent applications are: U.S. patent application Ser. No. 17/103,641 filed Nov. 24, 2020; and U.S. patent application Ser. No. 17/243,491 filed Apr. 28, 2021; wherein the disclosures and contents of which are incorporated herein by reference in their entireties as if fully set forth below.

CROSS REFERENCE TO RELATED PATENTS

This present U.S. non-provisional patent application is related to previous U.S. patents by the same inventor related to the disposal of nuclear waste material in deep underground formations, wherein these related U.S. patents are U.S. Pat. Nos. 10,807,132, 10,518,302, 10,427,191, and 11,339,611; wherein the disclosures and contents of which are incorporated herein by reference in their entireties as if fully set forth below.

STATEMENT REGARDING FEDERAL SPONSORSHIP

No portion of the present U.S. non-provisional patent application nor the inventions and embodiments shown and described herein were made with nor paid for by U.S. federal governmental sponsorship.

TECHNICAL FIELD OF THE INVENTION

The present invention relates generally to the disposal of hazardous radioactive uranium hexafluoride (UF6) waste products, materials, and/or derivatives thereof; and more particularly, the invention relates to the management and disposal of uranium oxides derived from processing UF6 and also of the disposal of empty (surface) metal storage containers that have been contaminated by UF6. These radioactive waste products are disposed of within deep geological repositories.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2022) there is a vast quantity of uranium hexafluoride (UF6) waste materials/products and/or derivatives accumulating across the world. UF6 is a chemical compound which has been used in the "front end" of the nuclear fuel cycle. UF6 is used in the nuclear conversion, enrichment, and nuclear fuel fabrication cycles.

At twenty (20) degrees Celsius, $UF_6$ is a solid crystalline mass with a density of about 5.06 grams per cubic centimeter (gm/cc). At and above its triple point, $UF_6$ exists in solid, liquid, and gaseous forms. Below its triple point, $UF_6$ is a solid or a gaseous. $UF_6$ is radioactive, deriving its radioactivity from the uranium component. Uranium is mainly an alpha and gamma radiation emitter. The radiation effect from $UF_6$ is minimal and an individual standing next to a storage cylinder of $UF_6$ for two hours would receive less than the equivalent of one dental X-ray dosage of radiation.

Although $UF_6$ has low specific activity, it is still dangerous since on contact with moist air $UF_6$ produces corrosive and toxic byproducts (derivatives). It is for this reason that a safe permanent disposal system and process is required. Today, the $UF_6$ is accumulating in rusting steel cylinders (container) on the ground (surface) across the U.S. and around the world. The current U.S. inventory may be in excess of 700,000 metric tons (MT) of the $UF_6$ materials (Nuclear Regulatory Commission [NRC] data). The world inventory is in excess of 1,200,000 MT of surface stored $UF_6$. And these amounts are growing. There is a significant need for new mechanisms and processes to safely get rid (dispose) of (or minimize) the current surface storage operations of this dangerous radioactive waste and its corrosive and toxic byproducts and to sequester such waste in a safe manner.

The problem of $UF_6$ management is massive. The $UF_6$ ($DUF_6$) material may be converted to stable uranium oxide (UOx/DUOx) which is now regulated as a low-level radioactive waste (LLW) and which has to be disposed of safely. Note, the "D" in $DUF_6$, DUOx, and/or the like refers to "depleted" as in depleted uranium.

Throughout this present patent application, $UF_6$ and $DUF_6$ may be used interchangeably to describe the uranium hexafluoride compound. In addition, DUOx, UOx, and/or $UO_2$ may be used interchangeably to describe the stable uranium oxide compound that is disposed of.

The size of the $UF_6$ disposal and management problem may be determined from the quantities of $DUF_6$ stored onsite today. The current $UF_6$ activity is concentrated in the U.S. at two (2) main sites of conversion operations, Paducah, KY, and Portsmouth, OH. Currently, conversion of the entire $UF_6$ inventory could result in the generation of a total of approximately 46,150 cylinders (446,515 metric tons [492,193 tons]) of UOx at Paducah and approximately 22,850 cylinders (199,337 metric tons [219,729 tons]) of UOx at Portsmouth.

Note, UF6 conversion generally refers to converting UF6 into one or more uranium oxides (DUOx/UOx, such as, but not limited to, $DUO_2$/$UO_2$).

Further, FIG. 1A (prior art) showing a Table 1 may show that at these two (2) U.S. sites, the expected time to complete the management of the uranium hexafluoride may vary from twenty (20) years to more than forty-four (44) years. This long operations timeline may creates problem and incurs extensive costs. This invention shortens such timeline considerably by allowing simultaneous operations at multiple sites where large volumes may be disposed of simultaneously and thereby may minimizes costs.

The U.S. federal government anticipates that management and disposal of uranium hexafluoride to last between thirty-two (32) years and up to as much as 100 years under current operational practices, which are very different from the management and disposal devices, systems, and methods taught and disclosed herein. The present management and disposal devices, systems, and methods taught and disclosed herein may make this time needed to manage $UF_6$ disposal much less. For example, possibly as much as a sixty percent (60%) reduction in time.

Some groups contemplate using the emptied $DUF_6$ metal storage cylinders (containers) for DU oxide packaging for storage, and potentially transport and disposal of the DU oxide. In this patent application, that approach is not recommended because it just unnecessarily "kicks the can down the road," and the stored $UO_x$ still needs safe final disposal at some future date. Typically, the metal storage cylinders (containers) are emptied of $DUF_6$ by heating and vaporization at the conversion facility and are placed into temporary storage while residual short-lived radioactivity is allowed to decay. Stabilizing agents are then introduced into the metal storage cylinders (containers) to neutralize any residual fluoride in the remaining material. After neutralization is complete, the now empty metal storage cylinders (containers) may be filled with the processed oxide and then disposed of or stored on the surface. There is still the problem of final disposal of the oxide. The current patent application provides devices, systems, and methods for resolving this continuing and recurring disposal problem.

Materially, $DUF_6$ occurs as environmentally hazardous uranium hexafluoride ($UF_6$), which actively interacts with water to form hydrofluoric acid and evaporates at a temperature above +56.4 degrees Celsius (° C.) without turning into liquid. The storage of $UF_6$ in metallic containers on industrial grounds requires extensive surface acreage and is environmentally hazardous. The outlook for utilization of $DUF_6$ for nuclear or other purposes is such that even in the case of the most successfully developed technology, only an insignificant part of available $DUF_6$ could be used in the next half-century. The inevitability of further $DUF_6$ accumulation and the need to create conditions for its safe long-term storage and disposal are quite apparent. It is possible to ensure safety of $DUF_6$ storage if $DUF_6$ is transformed into $UO_2$, $U_3O_8$ and/or metallic uranium and then stored safely. This patent application teaches devices, systems, and methods to ultimately dispose of the $UF_6$ safely.

Today there are "wet" and "dry" industrial processes for $UF_6$ conversion. The primary "wet" process is used by Cameco in Canada, by Orano in France, at Lanzhou in China, and Seversk in Russia. An alternative, "dry" process is used in the U.S. In the dry process, uranium oxide concentrates are first calcined (heated strongly) to drive off some impurities, then agglomerated and crushed. At Converdyn's U.S. conversion plant, $U_3O_8$ is first made into impure $UF_6$, and this is then refined in a two-stage distillation process. In an "AUC" $UF_6$ conversion process, gaseous $UF_6$ is fed into a stirred aqueous system at the same time as gaseous $CO_2$ and $NH_3$. The ammonium uranyl carbonate precipitate is filtered then subsequently decomposed in a fluidized bed reactor to yield $UO_2$. In an "ADU" $UF_6$ conversion process, $UF_6$ is fed into water to produce a solution of uranyl fluoride ($UO_2F_2$) and dilute hydrofluoric acid. This solution is treated with gaseous or aqueous ammonia to precipitate ammonium diuranate (ADU). The ADU is filtered and washed with hot water and then converted to $UO_2$ using hydrogen or cracked ammonia. Some processes calcine to $U_3O_8$ before reduction. In an integrated dry route (IDR) process, $UF_6$ is converted directly to a ceramic grade $UO_2$ powder by interaction of $UF_6$ vapor with steam and hydrogen in a rotary Inconel kiln. In a GECO process, vaporized $UF_6$ is fed into a flame reactor in which $U_3O_8$ is formed by reaction with oxygen (air) and hydrogen. This $U_3O_8$ is further reduced in a kiln to produce $UO_2$. (GECO is a trademark of General Electric.) In some fluidized bed processes, $UF_6$ is converted to $UO_2$ by steam and hydrogen via $UO_2F_2$ in multiple fluidized bed reactors. All of the above processes are prior art operations that are available to prepare the $UF_6$ for final disposal as the stable oxide UOx.

Uranium oxides are solid thermally and chemically stable compounds that fail to react with water and its vapors up to 300 degrees Celsius (° C.), and uranium oxides are insoluble in most mineral and organic acids. During the processing of $DUF_6$, uranium will be defluorinated and transferred from a potentially chemically hazardous substance to a safer one, which significantly minimizes risks. Final uranium oxides products may be safely packaged, transported, and disposed of as shown and described later in this patent application.

FIG. 1B (prior art) shows Table 2 of at least some physical properties and/or characteristics of at least some uranium compounds, such as, some uranium oxides and uranium hexafluoride ($UF_6$).

Uranium dioxide ($UO_2$/$DUO_2$) may exist in various compacted forms, such as, but not limited to, aggregates and sintered shapes, that are stable and with low porosity; and/or in powder form that may be potentially pyrophoric unless treated. $UO_2$ compacted forms may have the highest compatibility with long-term storage (containment). The life cycle cost (LCC) may be somewhat higher for $UO_2$ compacted forms than that for $U_3O_8$ (e.g., conversion, storage, and disposal) because of additional sintering/compaction costs. $UO_2$ compacted forms may have good compatibility with high-priority reuse options.

$U_3O_8$ may exist in forms with high stability and compatibility with long-term storage. The Life Cycle Cost (LCC) (e.g., conversion, storage, and disposal costs) may be about eighty percent (80%) higher than that for $UF_4$. Forms of $U_3O_8$ may have the lowest compatibility with reuse (of the options noted here). $U_3O_8$ may be a most stable form, insoluble, and may meet disposal waste acceptance without further treatment.

In some embodiments, the forms of converted $UF_6$ considered for disposal using the devices, systems, and/or methods shown and described herein may be as follows: $UO_2$ in aggregate and/or sintered shapes forms; $UO_2$ powder; $UO_3$ powder; $U_3O_8$; $UF_4$ powder; portions thereof, combinations thereof, and/or the like. $UO_3$ powder may meet regulatory criteria for safe disposal. $UF_4$ powder may be relatively stable and may meet land disposal restrictions with no further treatments. In some embodiments, $UO_2$ may be a desired form of uranium oxide waste for disposal as shown, disclosed, described, and taught herein. In some embodiments, the primary waste (converted) material UOx may be characterized as follows: a bulk density varying from two (2.0) to five (5.0) grams per cubic centimeter (g/cc) depending on the process by which the uranium oxide is prepared. See e.g., FIG. 1B of Table 2.

Public hearings and/or meeting on the subject of nuclear waste have raised at least some of the following issues: (a) local and regional aquifer pollution problems in the case of leakage and filtration of surface and near surface waters; (b) the solubility of nuclear waste materials in water, especially saline water; (c) the long-term stewardship of nuclear wastes, including tremendous financial liability over decades, if not longer; and/or the like.

In the case of the $UF_6$ there are also numerous problems which have yet to be overcome successfully before disposal of $UF_6$ can be considered safe and routine. $UF_6$ is very toxic. $UF_6$ can be a crystalline solid like rock salt. In metal (surface) storage cylinders the $UF_6$ may exist as solid salt at the bottom of the storage cylinder and as $UF_6$ gas above the solid phase, in the storage cylinder, at less than atmospheric pressure.

To date, the problems to be resolved occur, at least in part, because the $UF_6$ is stored in surface or near surface facilities in tanks. The $UF_6$ treatment alternatives used today are: (a) keep $UF_6$ in storage forever at the plants/facilities, at the surface, generally where the $UF_6$ was produced, at very high costs; (b) long-term consolidated storage of $UF_6$ (e.g., storage of $UF_6$ in cylinders in yards, buildings, or in mines at a consolidated site), also at high cost; (c) converting to oxides and keeping the converted products in storage in warehouses, below-ground vaults (but near surface), or a mine (near surface) at a consolidated site; and/or (d) some very limited commercial use of the converted $UF_6$ material which include radiation shielding, dense material applications other than shielding, and light water reactor and advance reactor fuel cycles (there may be other esoteric/minor uses for $UF_6$ in industry, but the total volumes needed are small compared to the available depleted metal supply).

There is a long felt, but currently unmet, need for devices, systems, and/or methods that would allow this type of nuclear waste, which exists in a variety of physical forms, to be packaged and safely disposed of very deeply within the earth's crust and in substantial quantities.

To solve the above-described problems, the present invention provides devices, systems, and/or methods to manage and dispose of the uranium hexafluoride and its product derivatives currently accumulating on the earth's surface (and/or near surface) as a result of the activities stated above.

Needs exists, for new devices, systems, and/or method to safely dispose of uranium hexafluoride wastes and its derivatives in a controlled manner and then depositing those wastes in a manner that is designed to meet the requirements of public acceptance along with regulatory guidelines as well as meet the actual physical volumetric/mass needs. It is to these ends that the present invention has been developed.

BRIEF SUMMARY OF THE INVENTION

To minimize the limitations in the prior art, and to minimize other limitations that will be apparent upon reading and understanding the present specification, at least some embodiments of the present invention may describe devices, systems, and/or methods of processing uranium hexafluoride ($UF_6$), its derivatives (such as, but not limited to, uranium oxides), and its used, but empty, metal storage casks, such that these derivatives and the used metal storage casks may then be disposed of (emplaced) within deeply located geological formation(s). In some embodiments, the structure(s) within the deeply located geological formation(s), for receiving the waste (e.g., the derivatives and the used metal storage containers), may be human constructed cavern(s) (which may be referred to as SuperSILO(s)). In some embodiments, the derivatives that get emplaced within the SuperSILO(s) may be one or more uranium oxide types (in various disposal forms). In some embodiments, the used but empty metal storage casks (that had formerly stored the UF6 and/or uranium oxides) that get emplaced within the SuperSILO(s) may be in non-intact forms, such as, but not limited to, crushed, chopped, cut, torn, ripped, pierced, mangled, shredded, ground, compacted, portions thereof, combinations thereof, and/or the like.

In some embodiments, a method of disposing of uranium oxides and of disposing/processing of metal casks that had formerly held uranium hexafluoride may comprise at least some steps of: (a) receiving at least a quantity of at least one type of uranium oxide; (b) receiving at least one metal cask selected from the metal casks that was formerly housing at least some quantity of the uranium hexafluoride; (c) cutting up and/or shredding the at least one metal cask into smaller pieces; and (d) loading at least some of the quantity of the at least one type of uranium oxide and/or loading at least some of the smaller pieces into one or more human-made caverns. In some embodiments, the one or more human-made caverns may be located within at least one deeply located geologic (rock) formation. In some embodiments, the at least one deeply located geologic (rock) formation may be located at least 2,000 feet vertically below a terrestrial surface of the Earth.

Note, deeply located human-made caverns (SuperSILOs) are detailed in at least U.S. Pat. No. 10,807,132, by the same present inventor, wherein the contents of that patent are incorporated by reference as if fully set forth herein.

In some embodiments, it may be a requirement of at least one embodiment, that the devices, systems, and/or methods are capable of the processing and disposing of large volumes (e.g., on the order of metric tons) of waste (e.g., the uranium oxides and/or the used but empty metal storage casks); may be effective and safe when implemented; may be scalable exponentially; and/or may provide for a high degree of versatility for multiple waste forms (e.g., the uranium oxides in various form and the used but empty metal storage containers in various non-intact forms).

It is an objective of the present invention to provide underground storage in deep closed geological systems, zones, and/or formations.

It is another objective of the present invention to utilize the conversion of $DUF_6$ (uranium hexafluoride) to stable packets of stable UOx (uranium oxide) forms for ultimate disposal in deep geological zones.

It is another objective of the present invention to implement deep geological disposal devices, systems, and/or methods for the long-term disposal of $DUF_6$ derivatives, such as, but not limited to, UOx (uranium oxides) in deep human-made caverns (SuperSILOs), wherein the SuperSILOs are located within deep geologic formation(s).

It is another objective of the present invention to allow the safe, easy, and economical (surface) transport of packages/containers of uranium oxide(s) (UOx).

It is another objective of the present invention to provide an underground storage of sufficient capacity for up to 1,000,000 pounds (lbs) or more of uranium oxide(s).

It is another objective of the present invention to mitigate the migration of waste materials away from the geological storage disposal zone(s).

It is another objective of the present invention to implement uranium oxide packages which are easily handled by conventional (surface) transportation means and technology, by road and/or by rail, without need for major modifications of the current transportation infrastructure.

It is another objective of the present invention to effectively dispose of the empty and used metal storage casks that had formerly held (depleted) uranium fluoride and/or its derivatives.

It is another objective of the present invention to convert the large, heavy, used, and empty metal storage casks, that had formerly held (depleted) uranium fluoride and/or its derivatives, into manageable and easily movable (surface) transportable, dimensionally smaller, pieces of metallic material.

It is another objective of the present invention to economically cut up these large, heavy, used, and empty metal storage casks (that had formerly held (depleted) uranium fluoride and/or its derivatives) into smaller pieces of metal by means such as, but not limited to, one or more of: waterjet cutting systems, laser cutting systems, plasma jet cutting systems, portions thereof, combinations thereof, and/or the like.

It is another objective of the present invention to economically shred these large, heavy, used, and empty metal storage casks (that had formerly held (depleted) uranium fluoride and/or its derivatives) into smaller pieces of metal by means such as, but not limited to, shredders and/or the like.

It is another objective of the present invention to minimize the total lifetime cost (TLC) of the cutting, packaging, and transportation operations for the management of the $DUF_6$, its conversion to UOx and its storage and ultimate disposal deep underground.

It is another objective of the present invention to minimize (surface) transport costs by disposing of the $DUF_6$, UOx, and the large, heavy, used, and empty metal storage casks (that had formerly held (depleted) uranium fluoride and/or its derivatives) as geographically close as possible to those locations where those materials originated.

It is another objective of the present invention to provide processing and disposal devices, systems, and methods that are relatively safe for operating personnel, especially as compared to prior art.

It is another objective of the present invention to provide processing and disposal devices, systems, and methods that are relatively safe to surrounding communities and/or the surrounding environment/ecosphere, especially as compared to prior art.

It is another objective of the present invention to provide processing and disposal devices, systems, and methods that are relatively cost effective compared to the prior art.

It is another objective of the present invention to locate the human-made cavern(s) (SuperSILO(s)) within deep geological formation(s).

It is another objective of the present invention to dispose of the UOx (uranium oxides), and the large, heavy, used, and empty metal storage casks (that had formerly held (depleted) uranium fluoride and/or its derivatives) within the human-made cavern(s) that are located the within deep geological formation(s).

It is another objective of the present invention to optionally, immerse the UOx (uranium oxide) waste materials and/or the large, heavy, used, and empty metal storage casks (that had formerly held (depleted) uranium fluoride and/or its derivatives) within a protective medium, wherein the combination of protective medium and the UOx, and the metal materials are all/both located within the human-made cavern(s).

It is yet another objective of the present invention to seal off these deep human-made cavern(s) with the emplaced waste materials to prevent migration and contamination of the environment outside of the sealed deeply located human-made cavern(s).

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. In some instances, some common items are left off of the drawings for clarity and ease of viewing. For example, in some instances specific devices, surface or downhole apparatuses may not be shown in a given view but it may be obvious to a person of ordinary skill in the relevant arts (technical fields) from the description, that these items may be present and/or used in the given embodiment.

FIG. 1A (prior art) shows Table 1 which shows that at two (2) preexisting U.S. sites an expected time to complete management of uranium hexafluoride ($UF_6$) conversion may vary from twenty (20) years to more than forty-four (44) years.

FIG. 1B (prior art) shows Table 2 of at least some physical properties and/or characteristics of at least some uranium compounds, such as, some uranium oxides and uranium hexafluoride ($UF_6$).

FIG. 7B is of Table 3 that shows waste storage/disposal capacities (in pounds) of human-made caverns of various sizes/dimensions.

REFERENCE NUMERAL SCHEDULE

Figure 1C:
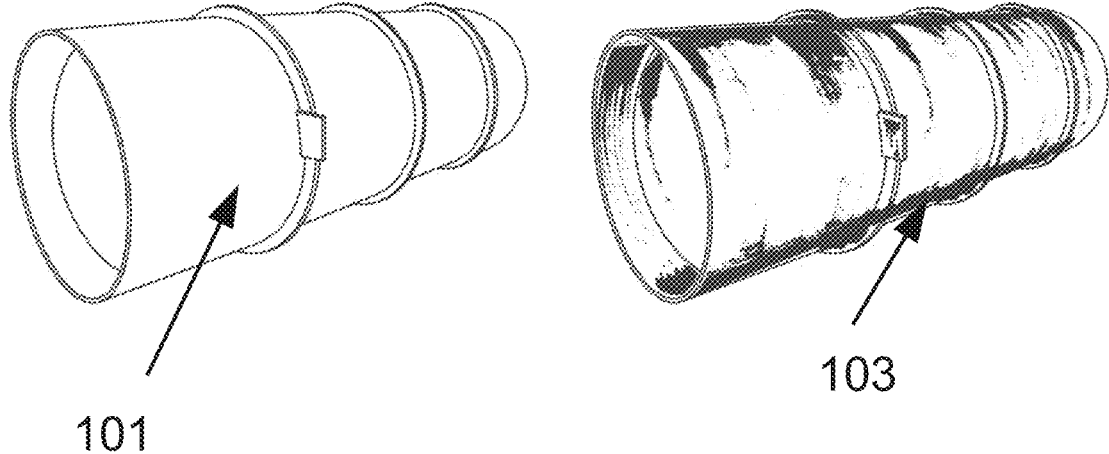
FIG. 1C (prior art) illustrates an example single new metal cask/container that is configured for housing $UF_6$ and also illustrates an example of an older rusted metal cask/container that is or was housing $UF_6$, wherein these two shown casks are shown side by side.

With regard to the reference numerals used herein, the following numbering is used throughout the various drawing figures.

101 new and/or clean steel cask/container for $DUF_6$ 101
103 rusted, old, and/or used steel cask/container for $DUF_6$103
105 steel cask/container housing $DUF_6$ 105
107 bulk bag for uranium oxide(s) 107
109 loop 109
111 pulling/lifting means 111
113 pallet 113
115 cutaway 115
117 uranium oxide 117
200 human-made cavern (SuperSILO) implementation/disposal system 200
201 drill rig 201
202 vertical wellbore 202
203 SuperSILO™ cavern (human-made cavern) 203
204 internal volume of human-made cavern 204
205 surface facilities for operations 205
206 Earth's surface 206
207 deeply located rock/geologic formation 207
208 vertical depth to top of human-made cavern 208
209 vertical height of human-made cavern 209
210 wellbore plug 210
211 waste-material 211
300 empty/used cask processing system 300
301 storage yard(s) for empty/used casks 301
303 work flow of casks or portions thereof 303
305 collection, clean, neutralize station(s) 305
307 cutter station(s) 307
309 shredder station(s) 309
311 collection station(s) for shreds 311
313 material processing train 313
400 high-pressure water jet cutting system 400
401 water storage and/or water source 401

403 high pressure pump 403
405 water flow line(s)/pipe(s)/conduit(s) 405
407 high pressure water accumulator(s) 407
409 high pressure water flow line(s)/pipe(s)/conduit(s) 409
411 controller/articulator 411
413 storage for abrasives 413
415 flow line(s)/pipe(s)/conduit(s) for abrasives 415
417 nozzle jet assembly 417
419 5-axis high-pressure water jet nozzle 419
421 high-pressure jet of water 421
423 material to be cut (portion of cask) 423
425 support-platform 425
501 used and empty DUF6 casks or portions thereof 501
503 shredding means (shredder teeth/jaws) 503
505 at least a portion of drive mechanism for shredding jaws 505
601 circumferential cut line(s) 601
603 axial or longitudinal cutline(s) 603
605 cut-up portion(s) of used and empty cask 605
700 method of disposing of uranium hexafluoride and/or of empty and used casks 700
701 step of locating $DUF_6$ storage casks, analyzing, modeling, and/or selection disposal formation(s) 701
703 step of removing $DUF_6$ from casks and emptying casks 703
705 step of conversion of $DUF_6$ to DUOx 705
707 step of collecting, cleaning, and neutralizing empty $DUF_6$ casks 707
707a step of receiving empty $DUF_6$ casks 707a
707b step of cleaning and/or neutralizing empty $DUF_6$ casks 707b
709 step of selecting the cask cutting means 709
711 step of cutting the casks into manageable smaller metal pieces 711
713 step of shredding cutup cask pieces 713
715 step of collecting cutup and/or shredded cask pieces 715
717 step of re-use or transporting cutup and/or shredded materials to disposal site 717
719 step of implementing SuperSILO in deep geological formation 719
721 step of preparing SuperSILO™ for storage of waste materials 721
723 step of using smaller drill rig and/or surface handling systems for disposal 723
725 step of collection and packaging of DUOx material 725
727 decision step of selecting the DUOx disposal form 727
729 step of implementing solid disposal form for DUOx 729
731 step of implementing cementitious/slurry/(foam) disposal form for DUOx 731
733 step of implementing bentonite/mud mixture disposal form for DUOx 733
735 step of loading UOx and/or cutup and/or shredded formerly intact casks SuperSILO 735
737 step of sealing/closing SuperSILO 737
800 surface equipment, components, system, and/or operations for UOx disposal 800
801 protected surface storage for UOx material 801
802 storage for cement or bentonite materials in oilfield type containers 802
803 storage for additives/chemical used in pumping/injection disposal processes 803
805 manifold flow lines for material flow 805

806 hopper for blending materials 806

807 pump 807

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Throughout this present patent application, $UF_6$ and $DUF_6$ may be used interchangeably to describe the (depleted) uranium hexafluoride compound. In addition, DUOx, UOx, and/or $UO_2$ may be used interchangeably to describe the stable uranium oxide compound(s) that is disposed of by embodiments of the present invention. Further, the "D" in $DUF_6$, DUOx, and/or the like refers to "depleted" as in depleted uranium. In some embodiments, the uranium referred to herein may be depleted uranium. In some embodiments, a source of uranium hexafluoride and/or a source of uranium oxides may be from at least one depleted uranium source.

Throughout this present patent application, human-made cavern and SuperSILO may be used interchangeably and may refer to the same structure.

Note, FIG. 1A and FIG. 1B are discussed above in the Background of the Invention section.

FIG. 1C (prior art) illustrates an example single new metal cask/container 101 that is configured for housing uranium hexafluoride ($UF_6$) and also illustrates an example of an older rusted metal cask/container 103 that is or was housing $UF_6$, wherein these two shown casks are shown side by side. Note, casks 101/103 are typically and commonly used throughout the U.S. in surface (or near surface) storage operations of storing $UF_6$. Cask 101 may be a new or "clean" container. Cask 103 may be an old, rusted storage container. In general, these casks 103 (with $UF_6$ inside) have been situated on the (Earth's) surface for significant periods of time, often of many years. After years being stored on gravel pads or cements pads the steel begins to rust and this illustrated by the blotches and/or dark patches shown on cask 103 in FIG. 1C. Casks 101/103 may be as long as 120 inches and have a diameter up to 48 inches. Casks 101/103 are made of steel and may have a wall thickness of 5/8 inch or more. It is noted that this thickness of steel may not present any problem for cutting up the metal casks 101/103 by devices, systems, and/or methods illustrated later in this patent application (such as, but not limited to, water jetting cutting processes). The nominal tare (empty) weight of the cask 101/103 may be as much as 4,500 pounds (lbs.). Cask 101/103 maximum net weight may be up to 21,030 lbs. The maximum gross weight may be as high as 25,530 lbs. Cask 101/103 may have a working pressure of 200 pounds per square inch gauge (psig) and are generally tested up to 400 psig. Regardless of casks 101 and/or of casks 103, the devices, systems, and/or methods taught herein are able to handle, process, address, cut, crush, chop, tear, rip, pierce, mangle, shred, ground, compact, and/or dispose for final (long-term) disposal into SuperSILO(s) 203 located within deep geologic formation(s) 207.

Figure 1D:
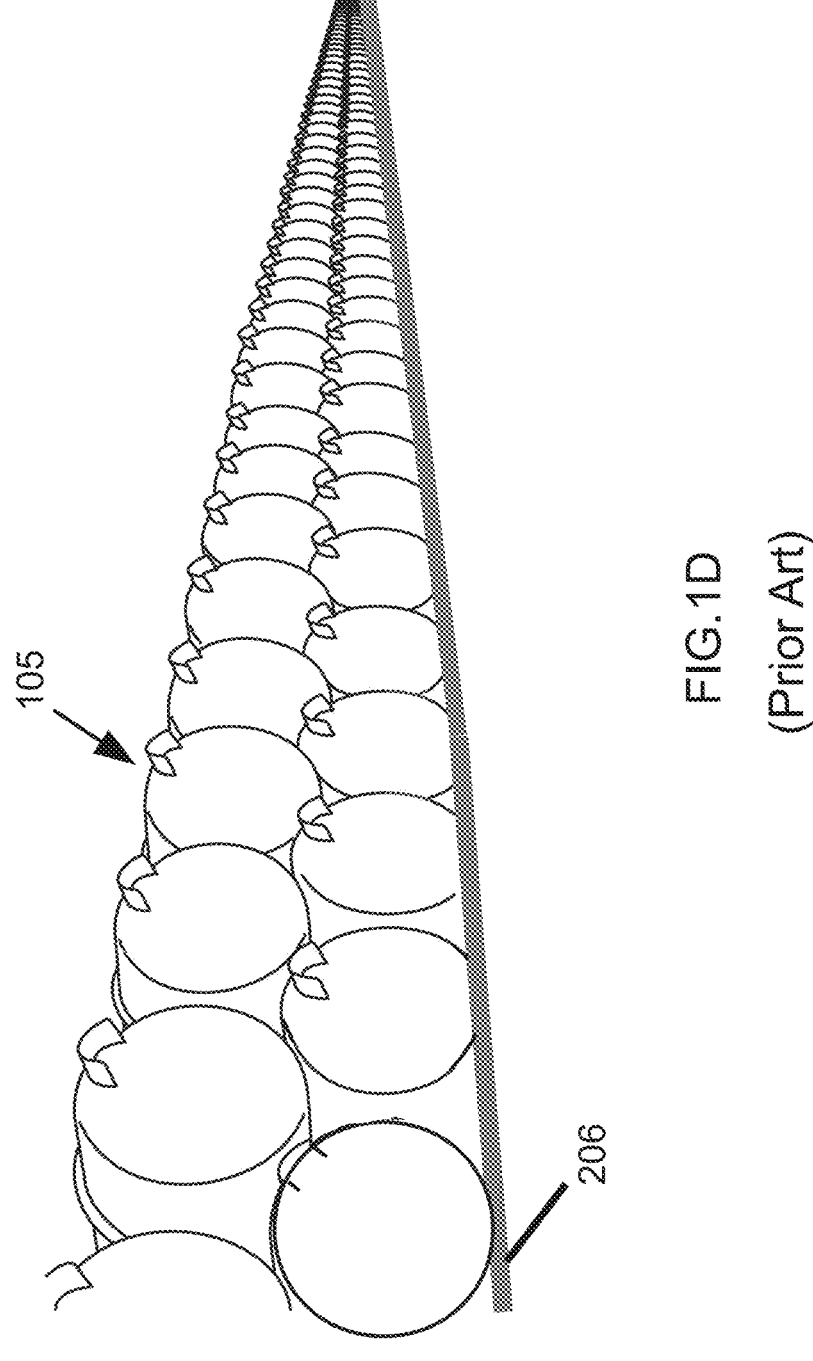
FIG. 1D (prior art) shows a long row of casks, stacked two casks high, wherein these casks house uranium hexafluoride ($DUF_6$), wherein these cask storage configurations are located at the (Earth's) surface around the U.S., at various surface storage facilities.

FIG. 1D (prior art) shows a long row of casks 105, stacked two casks 105 high, wherein these casks 105 house/store $DUF_6$ ($UF_6$). Cask 105 may be of (new) cask 101, of (old/rusted) cask 103 type, and/or of cask types in between new and old. In prior art storage systems, these casks 105 are generally at or near the surface 206 (ground 206). As designed these casks 105 with UF6 were never intended to be a permanent storage/disposal solution for the UF6 contained within. As designed these casks 105 with UF6 were intended to be a temporary storage/disposal solution for the UF6 contained within until a permanent disposal/storage solution could be implemented. Currently, these casks 105 are usually stacked in two (2) tiers horizontally (e.g., as shown in FIG. 1D), but are sometimes (infrequently) stacked up to three (3) tiers high on a prepared surface close to the operations plant that produced the $DUF_6$. There may be more than 10,000 casks 105 stored at any given site across the U.S. Casks 105 are usually stored behind a secure fence and in a guarded and protected compound. Casks 105 may be handled and/or manipulated by mechanical means, such as, but not limited to, mobile cranes, mobile gantries, dedicated forklift systems, and other preexisting materials handling devices.

In some embodiments, the at least one metal cask 105 may be a metal cask that currently houses $DUF_6$ ($UF_6$) or that has formerly held $DUF_6$ ($UF_6$). In some embodiments, the at least one metal cask 105 may have a substantially cylindrical shape. In some embodiments, the at least one metal cask 105 may have a wall thickness of 1.5 inches, plus or minus 0.1 inch in at least some location on the at least one metal cask 105. See e.g., FIG. 1D.

Figure 1E:
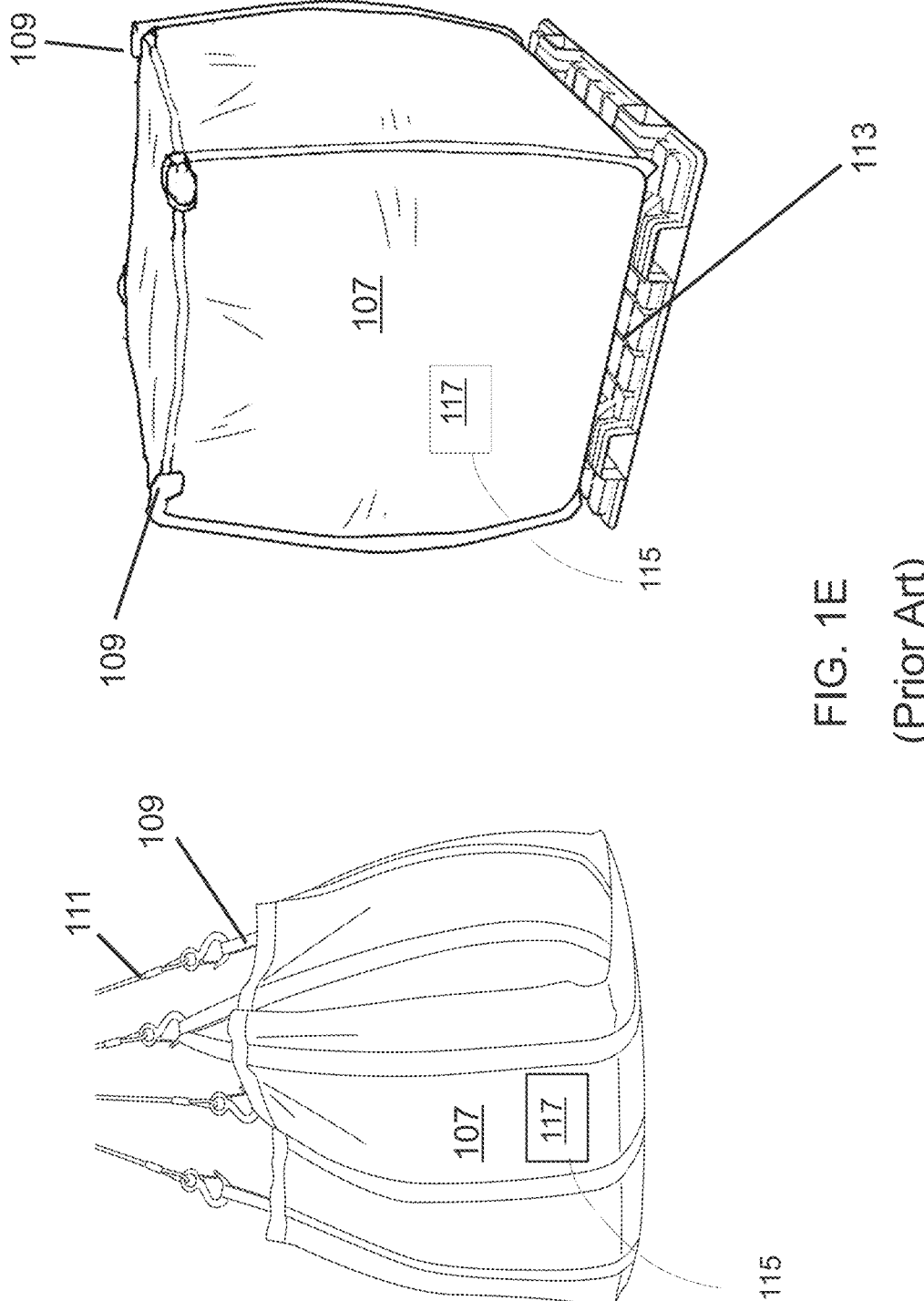
FIG. 1E (prior art) shows two examples of bulk bags, shown side by side, wherein a given bulk bag is configured to house uranium oxide(s) (UOx/DUOx) that are in granular forms.

FIG. 1E (prior art) shows two examples of bulk bags 107, shown side by side, wherein a given bulk bag 107 is configured to house uranium oxide(s) (UOx/DUOx) that are granular forms. Top corners of a given bulk bag 107 have loops 109. Loops 109 are configured for removable attachment to pulling/lifting means 111. Pulling/lifting means 111 may have a clip/hook, a length of cable, and may be operatively attached to mobile cranes, mobile gantries, and/or the like that are configured for lifting full bulk bag 107 (full of uranium oxide(s)) up off a ground surface and/or up off a pallet 113. Bulk bags 107 were introduced in the 1950s, while bulk bags 107 were available later to allow packing and shipping on regular palletized 113 systems. Bulk bags 107 were known as flexible intermediate bulk containers (FIBC) or SuperSaks. Bulk bags 107 were heavily adopted across the U.S. during the 1980s. Bulk bags 107 are cheap, dependable, and easily handled, features that make bulk bags 107 suitable for managing the large volumes of material associated with $DUF_6$ disposal processes. Bulk bags 107 have been mostly used for cement and hazardous materials early on. Bulk bags 107 are now used across a range of industrial, agricultural, pharmaceutical, and other products. Bulk bags 107 are capable of transporting the uranium oxide(s) (UOx) granular materials produced during the conversion processing of $DUF_6$. A typical bulk bag 107 may have a heavy weight fabric body (e.g., the bulk bag 107 shown on the left side of FIG. 1E) or bulk bag 107 may be a heavy weight plastic impregnated fabric system (e.g., the bulk bag 107 shown on the right side of FIG. 1E). In either case the bulk bags 107 have lift points (loops 109) for ease of handling and transport. The present-day bulk bags 107 may carry between 2,000 and 4,000 lbs. (pounds) of material (e.g., uranium oxide(s)) and are usually designed with a safety factor of about four (4.0). FIG. 1E may also show cutaways 115 in bulk bag(s) 107, wherein within cutaways 115 may be shown uranium oxide 117 (UOx 117). In some embodiments, it may be such 117 that may be permanently or long-term disposed of within human-made cavern(s) 203. Note, long-term disposal as used herein may be a minimum of 100 years, a minimum of 250 years, a minimum of 500 years, a minimum of 1,000 years, or longer.

There may be several additional benefits to the use of bulk bags 107 as taught in this patent application. For example, a typical forklift can easily handle a bulk bags 107, requiring no specialized and/or new equipment. Bulk bags 107 are also stackable to double-stacked or triple-stacked for efficient uranium oxide(s) temporary storage. In some cases, the bulk bags 107 may be re-useable.

Figure 2:
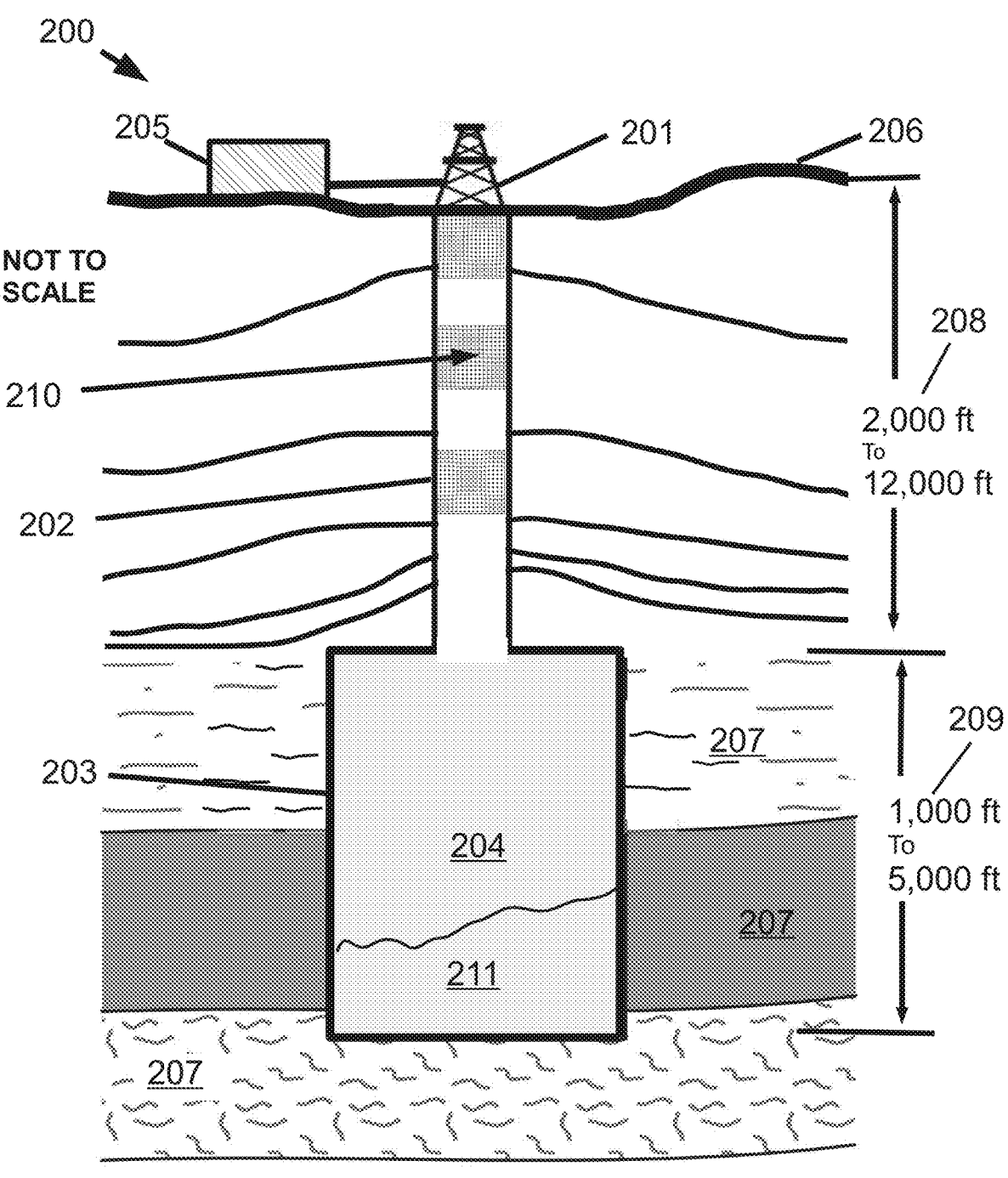
FIG. 2 may depict a schematic cross-section of a system for storing and/or disposing of uranium oxide(s) waste materials and/or of processed (e.g., cleaned, neutralized, cut up, and/or shredded) empty and used casks (that formerly housed uranium hexafluoride), within at least one human-made cavern, wherein the at least one human-made cavern is located within a given deep rock (geologic) formation.

FIG. 2 may depict a schematic cross-section of a system 200 for storing and/or disposing of uranium oxide(s) waste materials and/or of processed empty and used casks 105, within at least one human-made cavern 203, wherein the at least one human-made cavern 203 is located within a given deep rock (geologic) formation 207. In some embodiments, a given human-made cavern 203 is always within a given deeply located rock/geologic formation 207 and is never shallowly located below surface 206 (always deeply located below surface 206). FIG. 2 may not be to scale. Note, the waste-materials 211 stored within internal volume 204 of a given human-made cavern 203 may be uranium oxide(s) waste materials (e.g., UOx 117) and/or processed empty and used casks 105 waste materials (such as, as in smaller pieces of formerly intact casks 105, i.e., cutup and/or shredded smaller pieces of formerly intact casks 105).

Note, deeply located human-made caverns 203 (SuperSI-LOs 203) are also described in U.S. Pat. No. 10,807,132, by the same present inventor, wherein the contents of that patent are incorporated by reference as if fully set forth herein. Further note, the deeply located human-made caverns 203 (SuperSILOs 203) shown and described in U.S. U.S. Pat. No. 10,807,132 utilizes a different reference numeral schedule as compared against the reference numeral schedule in this present patent application.

Continuing discussing FIG. 2, In some embodiments, a substantially vertical wellbore 202 may be drilled from the Earth's surface 206 to deeply located rock formation 207 using a drill rig 201 located at a drill site on the Earth's surface 206. In some embodiments, a distal portion of that substantially vertical wellbore 202 (e.g., distal from Earth's surface 206) may be under-reamed into deeply located rock formation 207 to form the given human-made cavern 203 (SuperSILO 203). In some embodiments, in practice vertical wellbore 202 and/or human-made cavern 203 may be drilled and/or under-reamed using air and/or foam as the drilling fluid. Air drilling and/or foam drilling are well-established in the oil field drilling industries, and they may be implemented relatively rapidly to drill a given vertical wellbore 202 and/or to under-ream to form a given human-made cavern 203. In some embodiments, "vertical" in this context may be substantially parallel with a direction of a local gravitational vector at that well site. In some embodiments, vertical wellbore 202 may communicatively link human-made cavern 203 to the Earth's surface 206 at the drill site and/or to drill rig 201. In some embodiments, an internal volume 204 of human-made cavern 203 is the volumetric space in which the uranium oxide(s) waste materials and/or the processed empty and used casks 105 are stored (emplaced).

Continuing discussing FIG. 2, in some embodiments, vertical wellbore 202 may provide a safe and effective pathway for loading the waste-material 211 into the given human-made cavern 203 from the Earth's surface 206. In some embodiments, vertical wellbore 202 may be fixed, static, and/or non-variable, with respect to diameter, width, and/or length of vertical wellbore 202. In some embodiments, a given diameter of vertical wellbore 202 may be selected from a range of fifteen (15) inches to thirty-six (36)

inches, plus or minus three (3) inches. Such diameter sizes for vertical wellbore 202 may permit ease of transit of a variety of waste-materials 211. In some embodiments, there may be at least one dedicated vertical wellbore 202 per a given human-made cavern 203.

Continuing discussing FIG. 2, in some embodiments, deeply located rock (geologic) formation 207 may be a deeply located geological rock formation. In some embodiments, formation 207 may be an igneous rock (like granite), a metamorphic rock, a tight shale, portions thereof, combinations thereof, and/or the like. In some embodiments, formation 207 may be located at a minimum depth from 2,000 feet to 12,000 feet, plus or minus 1,000 feet, from the Earth's surface 206 (and then may extend further below the Earth's surface 206 from that minimum depth). In some embodiments, vertical depth 208 from Earth's surface 206 to a top of human-made cavern 203 may be a depth from 2,000 feet to 12,000 feet, plus or minus 1,000 feet. In some embodiments, a given human-made cavern 203 may be located within a given formation 207. In some embodiments, vertical wellbore 202 may have a fixed, static, and/or non-variable length from the Earth's surface 206 to formation 207 and/or to human-made cavern 203.

Continuing discussing FIG. 2, in some embodiments, a given human-made cavern 203 may have a fixed, static, and/or non-variable (vertical) height 209 (extending downwards into formation 207). In some embodiments, a given human-made cavern 203 may have a fixed, static, and/or non-variable (vertical) predetermined (vertical) height 209 (extending downwards into formation 207). In some embodiments, a given human-made cavern 203 may have a fixed, static, and/or non-variable (vertical) (vertical) height 209 (extending downwards into formation 207) selected from a range of 2,000 feet to 5,000 feet, plus or minus 100 feet. In some embodiments, a (vertical) height 209 (extending downwards into formation 207) of human-made cavern 203 may be other predetermined heights (lengths).

Continuing discussing FIG. 2, in some embodiments, drill rig 201 (at the drill site on the Earth's surface 206) may be used to: operate drilling equipment to form vertical wellbore 202; to operate under-reaming equipment to form a human-made cavern 203; to facilitate loading (or unloading) of the waste-materials 211 into (or out of) the given human-made cavern 203 through vertical wellbore 202; portions thereof; combinations thereof; and/or the like.

Continuing discussing FIG. 2, in some embodiments, a top of a given SuperSILO 203 may normally be below a top of a given deeply located rock/geologic formation 207 where the given SuperSILO 203 may be implemented within. For example, and without limiting the scope of the present invention, the top of the given deeply located rock/geologic formation 207 may be 12,000 feet below the surface 206, however, the top of the given SuperSILO 203 may start at 12,500 feet deep below the surface 206 (which then is 500 feet below the top of the given deeply located rock/geologic formation 207) and that given SuperSILO 203 may further deeply extend from 13,500 feet to 17,500 feet deep below that surface 206. In this way there is no discontinuity of the given deeply located rock/geologic formation 207 at the top of that given SuperSILO 203. The SuperSILO 203 may be thus fully surrounded by the same/homogenous type rock (the given deeply located rock/geologic formation 207) which meets the prerequisite requirements/desires for good disposal and allows a surface or wall material continuity.

Continuing discussing FIG. 2, in some embodiments, system 200 may comprise surface storage operations facility 205. In some embodiments, surface storage operations facility 205 may be located on or proximate to the Earth's surface 206. In some embodiments, surface storage operations facility 205 may be located near, adjacent, or proximate to the drill site and/or to drill rig 201. In some embodiments, surface storage operations facility 205 may be in operable communication with drill rig 201. In some embodiments, surface storage operations facility 205 may house and/or store: equipment for drilling out vertical wellbore 202; equipment for under-reaming human-made cavern 203; equipment for loading (or unloading) waste-materials 211 into (or out of) human-made cavern 203; loading equipment; waste-materials 211; portions thereof; combinations thereof; and/or the like.

Continuing discussing FIG. 2, in some embodiments, a given human-made cavern 203 may comprise stored waste-materials 211 which may be loaded from the Earth's surface 206 drill site location by mechanical and/or by gravitational means operated and/or controlled via drilling rig 201 which may facilitate loading of the waste-materials 211, in selected batches, via the substantially vertical wellbore 202 into the given human-made cavern 203. In some embodiments, waste-materials 211 stored within internal volume 204 of a given human-made cavern 203 may be uranium oxide(s) waste materials and/or processed empty and used casks 105 waste materials. In some embodiments, it is contemplated that in a single human-made cavern 203 there may be hundreds or thousands of pounds of waste-materials 211 in that given human-made cavern 203.

Continuing discussing FIG. 2, in some embodiments, a given vertical wellbore 202 may be sealed off (closed off) with one or more wellbore plug(s) 210. In some embodiments, wellbore plug(s) 210 may be used to seal off (close off) vertical wellbore(s) 202. In some embodiments, one or more wellbore plug(s) 210 may be deposited within the at least one vertical wellbore 202, with an intention to permanently and/or completely closing off and/or sealing off that the at least one vertical wellbore 202. In some embodiments, wellbore plug(s) 210 may be several thousand feet in vertical extent and provide a maximum sealing effect against wellbore flow between the human-made cavern 203 and the surface 206 (+/−100 feet). In some embodiments, the one or more plug(s) 210 may be of one or more predetermined cements and/or cementitious materials. In some embodiments, the one or more plug(s) 210 may be inserted, deposited, landed, pumped, and/or the like into place within the at least one vertical wellbore 202 by use of drilling rig 201 from surface 206. In some embodiments, use of wellbore plug(s) 210 in this fashion may be done when internal volume 204 of a given human-made cavern 203 is filled with waste-materials 211 to some predetermined level (volume and/or mass).

Figure 3:
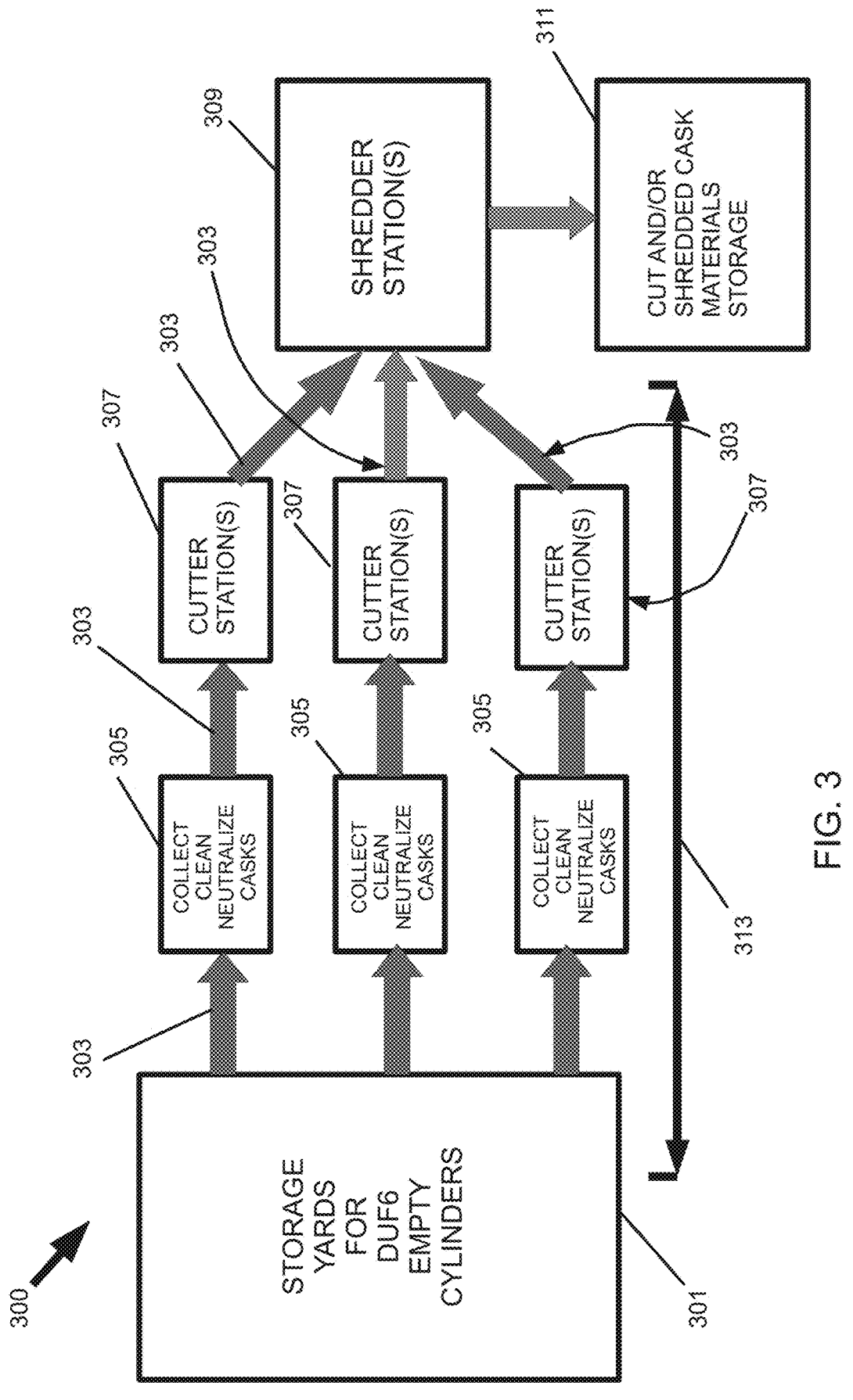
FIG. 3 depicts a system and/or a method of processing empty and used casks (that formerly housed uranium hexafluoride) into smaller portions/pieces, wherein such processing may comprise cleaning, neutralizing, cutting up, and/or shredding of those casks.

FIG. 3 depicts a system 300 and/or a method 300 of processing empty and used casks 105 into smaller portions, such as, but not limited to, crushed, smashed, bent, chopped, cut, torn, ripped, pierced, mangled, shredded, ground, pulverized, frozen, melted, compacted, portions thereof, combinations thereof, and/or the like of the empty and used casks 105. In some embodiments, these smaller portions of empty and used casks 105 may be disposed of within internal volume 204 of a given human-made cavern 203. In some embodiments, reference numeral "301" may denote various surface (temporary) storage facilities of empty, used, and intact casks 105. In some embodiments, these surface (temporary) storage facilities may be storage yard(s) 301. In some embodiments, storage yard(s) 301 may be onsite with respect to at least other elements of system/method 300, such as, but not limited to, at least one of the station(s). In some embodiments, storage yard(s) 301 may be offsite. In some embodiments, storage yard(s) 301 may be in warehouse(s) and/or may be outdoors on the surface (similar to that of FIG. 1D). In some embodiments, reference numeral "303" may denote material flows of empty and used casks 105 or portions thereof (e.g., the smaller portions) from one location/station to another within system/method 300. In some embodiments, the empty and used casks 105 (or portions thereof [e.g., the smaller portions]) may flow from storage yard(s) 301 to cleaning/neutralizing station(s) 305. In some embodiments, system/method 300 may comprise one or more cleaning/neutralizing station(s) 305. In some embodiments, cleaning/neutralizing station(s) 305 may be configured to collect (receive), clean, and neutralize the empty and used casks 105. In some cases, air heated autoclaves may be used to vaporize the remaining $DUF_6$ to clean out the used and empty casks 105. In some cases, the remaining $DUF_6$ may be removed by washing the used and empty casks 105 with water and the resulting aqueous acid solutions may be chemically treated. This may include evaporation and neutralization with lime. In some embodiments, at cleaning/neutralizing station(s) 305 the empty and used casks 105, which may still contain residual quantities of toxic $DUF_6$, are cleaned mechanically, and further chemically to neutralize residual $DUF_6$ waste material present on the empty and used casks 105, which may result in a fully cleaned and/or neutralized the empty and used casks 105. In some embodiments, after the empty and used casks 105 have been cleaned and/or neutralized, the empty and used casks 105 may then proceed to cutting station(s) 307.

Figure 4:
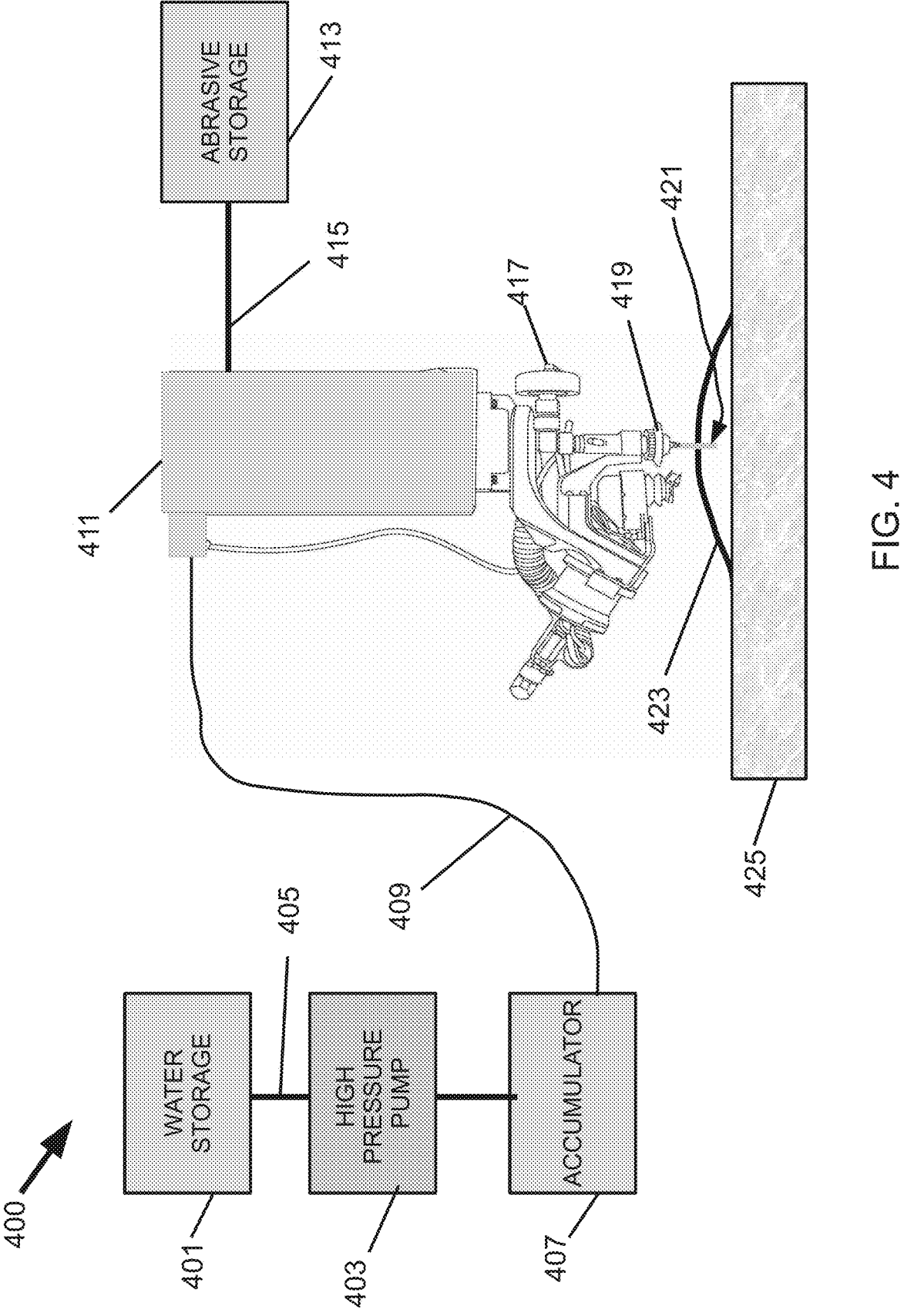
FIG. 4 depict a schematic block diagram of a high-pressure water jet cutting system that may be configured for cutting up the empty and used casks that are available after the $DUF_6$ is removed from the empty and used casks.

Continuing discussing FIG. 3, in some embodiments, system/method 300 may comprise one or more cutting station(s) 307. In some embodiments, the cutting station(s) 307 may be configured to cut intact empty and used casks 105 into cut-up portions thereof using at least one cutting means. FIG. 4 may show one example of the at least one cutting means, namely a water jet cutting system 400. In some embodiments, the at least one cutting means, executed by cutting station(s) 307, may be selected from one or more of: a waterjet cutting system (such as, but not limited to, high-pressure water jet cutting system 400), a laser cutting system, a plasma jet cutting system, portions thereof, combinations thereof, and/or the like. In some embodiments, after processing by the cutting station(s) 307 the empty and used casks 105 may no longer be intact. These cut pieces of metal (the cut-up portions of empty and used casks 105) are now more manageable and may be move/transported to the next process step which is the shredder operations at shredder station(s) 309.

Continuing discussing FIG. 3, in some embodiments, after the empty and used casks 105 have been cut by the cutting station(s) 307, the now non-intact (cut-up) empty and used casks 105 may move onto shredder station(s) 309. See FIG. 5 for an example shredder 309. In some embodiments, system/method 300 may comprise one or more shredder station(s) 309. In some embodiments, a given shredder station 309 may be configured to shred-up the cut-up parts of the empty and used casks 105. In some embodiments, output(s) from shredder station(s) 309 may be shredded-up portions of the empty and used casks 105, i.e., the smaller portion of the empty and used casks 105 that may be (permanently) disposed of within internal volume 204 of a given human-made cavern 203. In some embodiments, shredder(s) 309 may mechanically shred the metal pieces of cut-up empty and used casks 105 into shredded pieces that may be inch-size ranging from one (1) inch to three (3)

inches in length and/or in width, +/−one-half (0.5) inch long/wide. In some embodiments, before the shredded-up portions of the empty and used casks 105 may be direct into the given human-made cavern 203, that shredded-up portions of the empty and used casks 105 (and/or the cut-up portions of the empty and used casks 105) may be temporarily stored processed waste materials storage 211.

Continuing discussing FIG. 3, in some embodiments, the output from shredder station(s) 309 may be directed to one or more collection station(s) 311. In some embodiments, collection station(s) 311 may be configured for receiving and/or (temporarily) storing the outputs from shredder(s) 309 and/or from cutter(s) 307.

Continuing discussing FIG. 3, in some embodiments, multiple simultaneous (concurrent) parallel operations may occur in executing system/method 300 in order to optimize efficiency of processing the empty and used casks 105. In some embodiments, these multiple simultaneous (concurrent) parallel operations may provide a train 313 of operations thus increasing waste-material 105 throughput and providing a level of security and redundancy in the event of breakdowns and/or accidents.

FIG. 4 depict a schematic block diagram of a high-pressure water jet cutting system 400 that may be configured for cutting up the empty and used casks 105 that are available after the DUF$_6$ is removed from the empty and used casks 105. In some embodiments, high-pressure water jet cutting system 400 may be an example of a cutting station 307 (cutter 307). In some embodiments, high-pressure water jet cutting system 400 and cutting station 307 may be used interchangeably. In some embodiments, the at least one cutting means, executed by cutting station(s) 307, may be selected from one or more of: a waterjet cutting system (such as, but not limited to, high-pressure water jet cutting system 400), a laser cutting system, a plasma jet cutting system, portions thereof, combinations thereof, and/or the like. In simplified terms, high-pressure water jet cutting system 400, may be fed/receive regular tap/municipal water and boosts a pressure of that water through a high pressure (intensifier) pump 403 and may add one or more abrasive agents to a high-pressure jet of water (plus abrasives in some embodiments) which may be directed at a material 423 resulting in that material 423 being cut (e.g., into smaller portions). In some embodiments, material to be cut 423 may be the empty and used casks 105 or portions thereof. In some embodiments, high-pressure water jet cutting system 400 may use a relatively small amount of water, only about fifteen (15) gallons of water per minute, +/−5 gallons. No special processing of the available source water 401 (such as, but not limited to, tap and/or municipal water) may be needed. In some embodiments, this may make high-pressure water jet cutting of the empty and used casks 105 cost effective, which may be an advantage plasma or laser cutting.

Continuing discussing FIG. 4, in some embodiments, high-pressure water jet cutting system 400 may comprise one or more of: water storage and/or water source 401; high pressure pump 403; water flow line(s)/pipe(s)/conduit(s) 405; high pressure water accumulator(s) 407; high pressure water flow line(s)/pipe(s)/conduit(s) 409; device controller system (articulator) 411; storage for abrasives 413; flow line(s)/pipe(s)/conduit(s) for abrasives 415; nozzle jet assembly 417; 5-axis high-pressure water jet nozzle 419; high-pressure jet of water 421; support-platform 425; portions thereof, combinations thereof; and/or the like.

Continuing discussing FIG. 4, in some embodiments, water storage and/or water source 401 may be a municipal/industrial water source and/or a storage device configured to receive the municipal/industrial water from the municipal/industrial water source. In some embodiments, storage device 401 may be a tank, vessel, container, bottle, portions thereof, combinations thereof, and/or the like that is configured to receive, house, and hold (non-high-pressure) water. In some embodiments, (lower pressure) water storage 401 may be a reservoir that supplies regular untreated tap/municipal water (or the like) for use in the water high-pressure jet cutting process 400. In some embodiments, water storage system 401 may be connected via low pressure water line 405 to a high-pressure pump system 403.

Continuing discussing FIG. 4, in some embodiments, water storage and/or water source 401 may feed into water high-pressure pump(s) 403 via one or more (low-pressure) water flow line(s), pipe(s), and/or conduit(s) 405. In some embodiments, water high-pressure pump 403 may output water from water high-pressure pump 403 at predetermined high-pressures. In some embodiments, water high-pressure pump(s) 403 may be driven by at least a fifty (50) horsepower (HP) electric motor, (+/−) 5 HP, and may be directly connected to existing main electric system on the premises. In some embodiments, no special electrical controls or adaptive systems are needed. This may be an advantage over plasma or laser jet cutting. In some embodiments, water high-pressure pump 403 may or intensifier 403 may elevate the water pressure to a level needed/required for cutting up the empty and used casks 105 (material 423). Today (2022), such water high-pressure pump 403 may deliver a water pressure from 90,000 pounds per square inch (psi) to 200,000 psi.

Continuing discussing FIG. 4, in some embodiments, water high-pressure pump 403 may feed into high-pressure water storage accumulator(s) 407 via one or more high-pressure water flow line(s), pipe(s), and/or conduit(s) 409. In some embodiments, connected to water high-pressure pump(s) 403 may be one or more accumulator device(s) 407 which may store the high-pressure water and that also may function as a pulsation damper on the pressure pulses that emanate from the cyclic nature of the water high-pressure pump(s) 403 action. In some embodiments, the accumulator 407 may be connected via a high-pressure water line 409 and to high-pressure nozzle jet assemblies 417. In some embodiments, high-pressure water storage accumulator 407 may be a tank, vessel, container, bottle, portions thereof, combinations thereof, and/or the like that is configured to receive, house, hold, and maintain water at predetermined high-pressures. In some embodiments, high pressure pistons inside water high-pressure pump 403 may move back and forth and compressing the water, sending the water out the lines 409 and into accumulator(s) 303. In some embodiments, accumulator 303 may take the pulses out of the strokes from the water high-pressure pump(s) 403 and may just basically provide the cutting nozzle 419 a clean pulse free jet of high-pressure water.

Continuing discussing FIG. 4, in some embodiments, (low-pressure) water flow line(s), pipe(s), and/or conduit(s) 405 and/or high-pressure water flow line(s), pipe(s), and/or conduit(s) 409 may be fitted with one or more of: check-valve, back-flow preventer, pressure regulator, flow meter, valve, T's, elbows, manifold, sample port, filter, bypass, portions thereof, combinations thereof, and/or the like.

Continuing discussing FIG. 4, in some embodiments, high-pressure water accumulator(s) 407 may feed high-pressure water into one or more high-pressure nozzle jet assemblies 417, via one or more interconnecting high-pressure water flow line(s), pipe(s), and/or conduit(s) 409. In some embodiments, high-pressure nozzle jet assembly 417 may comprise at least one 5-axis high-pressure water jet nozzle 419. In some embodiments, the high-pressure water 421 may exit high-pressure nozzle jet assembly 417 from 5-axis high-pressure water jet nozzle 419 as a jet/stream of high-pressure water 421 and be directed, focused, and/or aimed onto material-to-be-cut 423 (e.g., empty and used casks 105 or portions thereof). In some embodiments, 5-axis high-pressure water jet nozzle 419 may have three or more degrees of freedom. In some embodiments, 5-axis high-pressure water jet nozzle 419 may be able to rotate and/or move in five (5) degrees of freedom. In some embodiments, high-pressure cutting water 421 may come out of 5-axis high-pressure water jet nozzle 419 at or above the speed of sound. In some embodiments, high-pressure cutting water 421 may comprise one or more types of abrasives. In some embodiments, for such high-pressure water cutting operations of material-to-be-cut 423, material-to-be-cut 423 may be supported, held by, mounted to, and/or the like to one or more support-platform(s) 425.

Continuing discussing FIG. 4, in some embodiments, high-pressure nozzle jet assembly 417/5-axis high-pressure water jet nozzle 419 may be moved and/or controlled by controller/articulator 411. In some embodiments, high-pressure nozzle jet assembly 417/5-axis high-pressure water jet nozzle 419 may be attached to controller/articulator 411. In some embodiments, controller/articulator 411 may be configured to move high-pressure nozzle jet assembly 417/5-axis high-pressure water jet nozzle 419 in at least two (2) degrees of freedom. In some embodiments, controller/articulator 411 may be configured to move high-pressure nozzle jet assembly 417/5-axis high-pressure water jet nozzle 419 in at least three (3) degrees of freedom. In some embodiments, controller/articulator 411 may move on tracks, rails, wheels, casters, slides, gantries, portions thereof, combinations thereof, and/or the like. In some embodiments, controller/articulator 411 may move pneumatically, hydraulically, via worm drives, via motors, via servos, portions thereof, combinations thereof, and/or the like. In some embodiments, controller/articulator 411 may behave as a computerized numerical controller (CNC) system which positions high-pressure nozzle jet assembly 417/5-axis high-pressure water jet nozzle 419 as desired/directed by an (human) operator and/or under automatic control of a "driver" computer program. In some embodiments, controller/articulator 411 may govern and control the operation of high-pressure nozzle jet assembly 417/5-axis high-pressure water jet nozzle 419. Cutting water jet column 421 may exit nozzle 419 driven by the inherent high water pressure in the water line(s) 409 and controlled by controller device 411.

Continuing discussing FIG. 4, in some embodiments, operationally, high-pressure water jet cutting system 400 may be run under the full or partial control of a computer system much like a typical CNC operation today. Operationally, two software control modules may be used. First, the design and drawing software that is called flow path which may program the architecture of the desired cut in 3D (three-dimensional) space; and then secondly, the flow cut software which may drive the high-pressure water jet 421 in a 5-axis mode controlling where the high-pressure water jet 421 may go. The flow cut may create a path for the high-pressure water jet 421 to follow. The flow path data is created and then imported into the flow cut driver program. The high-pressure water jet cutting system 400 may then run in full automatic mode cutting the empty and used casks 105 (material 423) as they may be sequentially fed into a cutting zone of the high-pressure water jet cutting system 400. It may also be possible and desirable depending on the total quantity of the empty and used casks 105 to be cut up, to scale and to operate a set of high-pressure water jet cutting systems 400 simultaneously in parallel, much like an assembly line with multiples lines of operation (see e.g., FIG. 3).

Continuing discussing FIG. 4, in some embodiments, the abrasives may be fed into (injected into) the high-pressure water line(s), pipe(s), conduit(s) 409, prior to exiting 5-axis high-pressure water jet nozzle 419 as high-pressure cutting water 421. In some embodiments, one or more storage for abrasives 413 may be configured to store and/or house the abrasives prior to injection into the high-pressure water line(s), pipe(s), conduit(s) 409. In some embodiments, storage for abrasives 413 may feed into the high-pressure water line(s), pipe(s), conduit(s) 409 by one or more flow line(s)/pipe(s)/conduit(s) for abrasives 415. In some embodiments, the abrasive type may be of garnet or the like. In some embodiments, the garnet abrasives may be sucked into a nozzle mixing chamber (e.g., of high-pressure nozzle jet assembly 417) by a vacuum created by the high velocity water jet motion, and the water/garnet mixture 421 together may exit the nozzle 419 at very high speeds (and high pressures). In some embodiments, this combined stream 421 of water and garnet abrasive actually does the cutting of the material-to-be-cut 423. The garnet abrasive is a durable, hard, inexpensive, and readily available natural mineral. Garnet is available at less than $1.50 per pound today (2022). This inexpensive cost is an additional reason why water jet cutting may be advantageous plasma or laser cutting methods in some embodiments. Propelled inside the water jet 421 the garnet may erode the material 423 and may make a clean and rapid cut up to more than 1.5 inches in steel material in seconds. In some embodiments, a metering disk may control the quantity of garnet being sucked into high-pressure nozzle jet assembly 417. This ubiquitous, inexpensive cutting material (e.g., garnet) may additionally make the waterjet cutting a desirable method of operational cutting up the empty and used casks 105 (materials 423).

Figure 5:
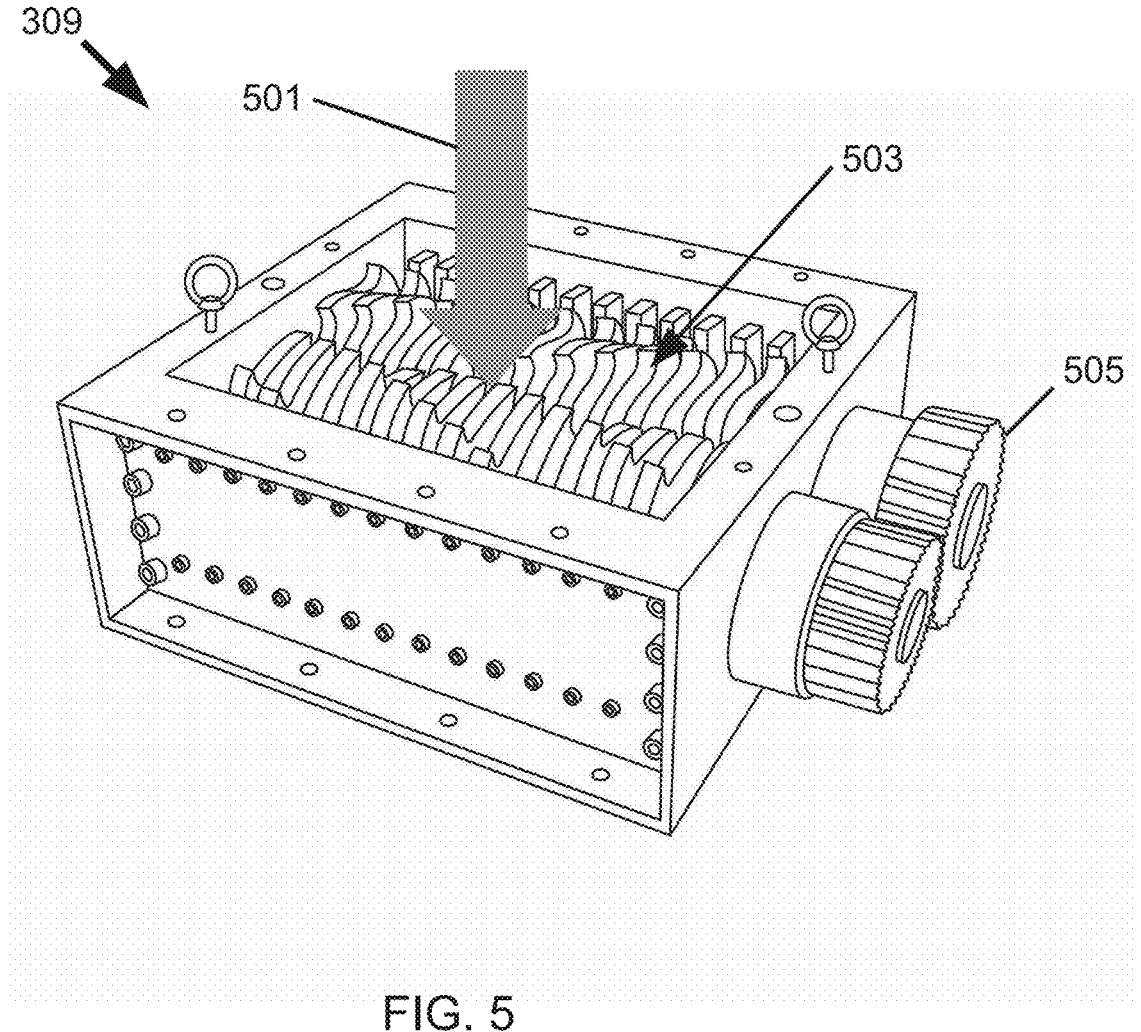
FIG. 5 may depict a shredder that is configured for shredding the empty and used casks (that formerly housed uranium hexafluoride) or portions thereof.

FIG. 5 may depict a schematic of a metal (steel) shredding machine, system, and/or operation 309 capable of shredding up the formerly cut up portions of the empty and used casks 105 which may follow the cutting operations of points 307 in FIG. 3. The purpose of a metal shredder 309 may be to accept relatively large pieces of metal that are too large for waste management or transport and to then shred (tear) such metal pieces into more usable smaller pieces as described earlier in FIG. 3. In some embodiments, metal shredders 309 come in various styles depending on the metals that they process. Large models may have 10,000 horsepower (HP) motors and may be capable of shredding trucks and automobiles. Metal shredding is a rapidly growing business due to the world's demand for recycled metals and is generally cost effective as a means of reducing large metal objects into smaller pieces. In some embodiments, the outputs of cutter(s) 307 and/or of high-pressure water jet cutting system(s) 400 may be fed into shredder(s) 309 as the inputs 501 to shredder(s) 309. That is, inputs 501 may be cut up portions of the empty and used casks 105. In some embodiments, metal pieces 501 from the preceding cutting operations 307 of FIG. 3 may be mechanically moved by conveyor means or hopper systems or some other generally available transport system and deposited as shown by direction arrow 501 into the jaws 503 (shredding means 503) of the shredder mechanism 309. The shredder station 309 is a very rugged shredder/chopper device with shredding means 503 (e.g., jaws 503) which shreds the metal pieces 501 as cut up earlier in the cutting process (e.g., cutter(s) 307 of FIG. 3 and/or FIG. 4). In some embodiments, FIG. 5 may also show at least a portion of a drive mechanism 505 that may operationally linked with jaws 503 (to power jaws 503). In some embodiments, shreds (of the empty and used casks 105) that are output from shredder(s) 309 may be nominally less than three (3) inches in width and/or in length. In some embodiments, shreds (of the empty and used casks 105) that are output from shredder(s) 309 may be received and/or collected into storage(s) 311. In some embodiments, such as multiple cutter(s) 307 may operate concurrently (simultaneously), in some embodiments, multiple shredders 309 may work concurrently (simultaneously) depending on the required/desired speed of disposal of the waste metal 501 and/or the different cost/benefit result that may be sought by waste operators.

Figure 6:
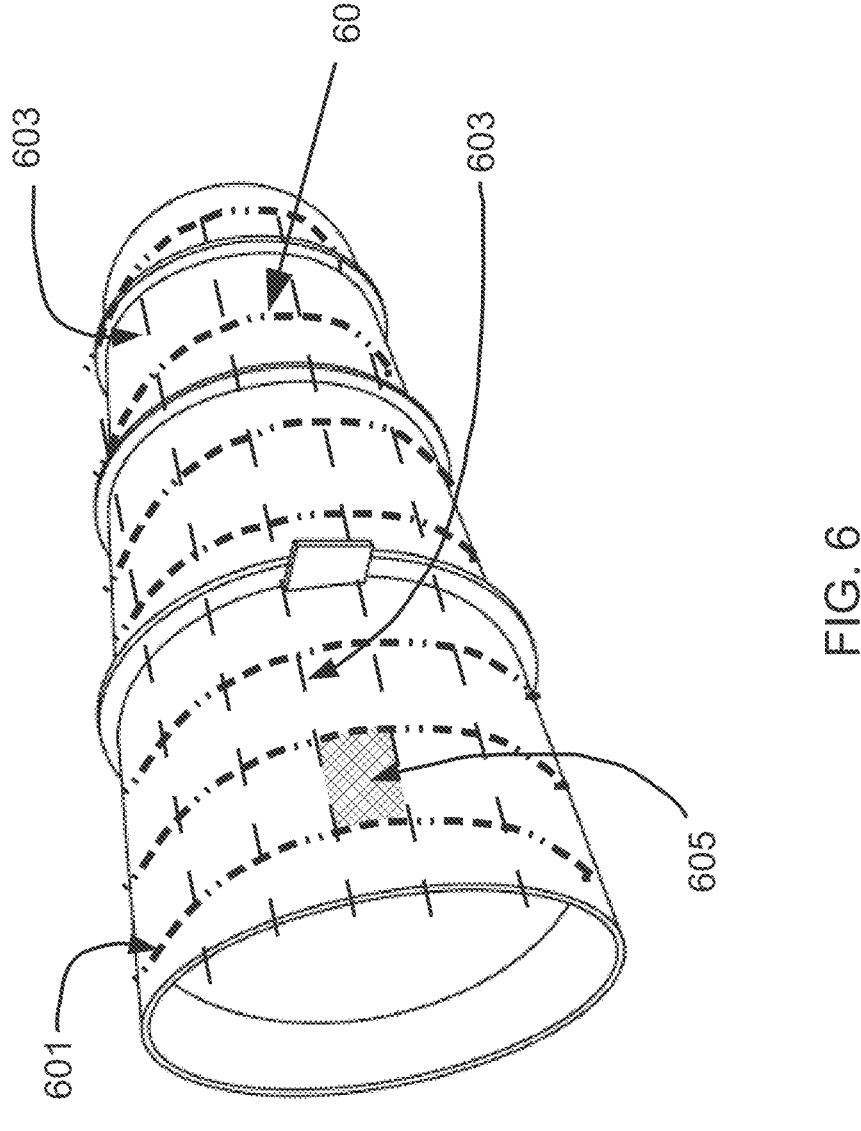
FIG. 6 may depict an empty and used cask (that formerly housed uranium hexafluoride) that is exteriorly marked up with cutlines, showing where a given empty and used cask 105 may be cut-up into smaller pieces.

FIG. 6 may depict an empty and used cask 105 that is exteriorly marked up with cutlines, showing where a given empty and used cask 105 may be cut-up into smaller pieces (via cutter(s) 307/400). FIG. 6 may depict a schematic of a marking operation on the metal of the empty and used casks 105, resulting in marking of various cutlines on an exterior of the metal of the empty and used casks 105, wherein these marks (cutlines) may indicate where cutting operations (e.g., from cutter(s) 307/400) may cut along. In some embodiments, circumferential cut line(s) 601 may be an exterior cutline along an exterior circumference of a given empty and used cask 105. In some embodiments, a given empty and used cask 105 may comprise a plurality of circumferential cut lines 601. In some embodiments, axial or longitudinal cutline(s) 603 may be an exterior cutline along an exterior of a given empty and used cask 105, from one end of that empty and used cask 105 to an opposite end of that empty and used cask 105, along a length of that empty and used cask 105. In some embodiments, at least one (1) circumferential cut line 601 and at least one (1) axial or longitudinal cutline 603 may be intersect each other. In some embodiments, at least one (1) circumferential cut line 601 and at least one (1) axial or longitudinal cutline 603 may be at least substantially (mostly) perpendicular with each other. In some embodiments, a given empty and used cask 105 may comprise a plurality of axial or longitudinal cutlines 603. In some embodiments, at least two (2) parallel and adjacent circumferential cut lines 601 and at least two (2) parallel and adjacent axial or longitudinal cutlines 603 may define a given cut-up portion 605 (smaller piece 605) of a given empty and used cask 105. In some embodiments, a given cut-up portion 605 may be a piece of a given empty and used cask 105 that has been cut off/cut free. In some embodiments, at least some intersections of the lines 601 and 603 may describe a closed polygonal or mostly rectangular section 605 which may describe a final size of the cut section of the given metal empty and used cask 105. In some embodiments, a given empty and used cask 105 may comprise a plurality of cut-up portions 605.

In some embodiments, a given empty and used cask 105 may be marked in this FIG. 6 operation for cutting by cutter(s) 307 and/or by high-pressure water jet cutting system 400 to ensure breakdown of the large metal given empty and used cask 105 into smaller pieces 605 of metal which later maybe shredded into further smaller pieces (e.g., as shown in FIG. 3 and/or FIG. 5). As indicated earlier in discussing high-pressure water jet cutting system 400 in FIG. 4 the water jet nozzle 419 may be controlled by device controller 411. In some embodiments, a pre-selected or directed path may be required in 3D (three-dimensional) for the controller 411 to effectively position the jet nozzle 419 to follow its programmed instructions. This FIG. 6 may illustrate two sets of directional cut lines. One directional is circumferential 601 and the other is axial 603. In some embodiments, these lines 601/603 may be orthogonal to each other (or at least mostly so). In some embodiments, the circumferential cut lines 601 may provide the path for the jet 419 to cut the given metal empty and used cask 105 in circumferential direction(s). In some embodiments, longitudinal or axial pathways are shown by lines 603 and may provide axial direction(s) for the water jet nozzle 419 to cut in.

In some embodiments, the markings (cutlines) shown in FIG. 6 may be programmed into the CNC system controller 411 of the high-pressure water jet cutting system 400 to allow the cutting operations to process the metal empty and used casks 105 sequentially and/or repeatedly. In some embodiments, in the continuous marking operations, the sizes, or physical dimensions of the metal empty and used casks 105 may vary and as such, the 3D cutting pathways required for successful operations in cutting may be modified on the fly as the physical the metal empty and used casks 105 vary in size and/or in shape.

Figure 7A:
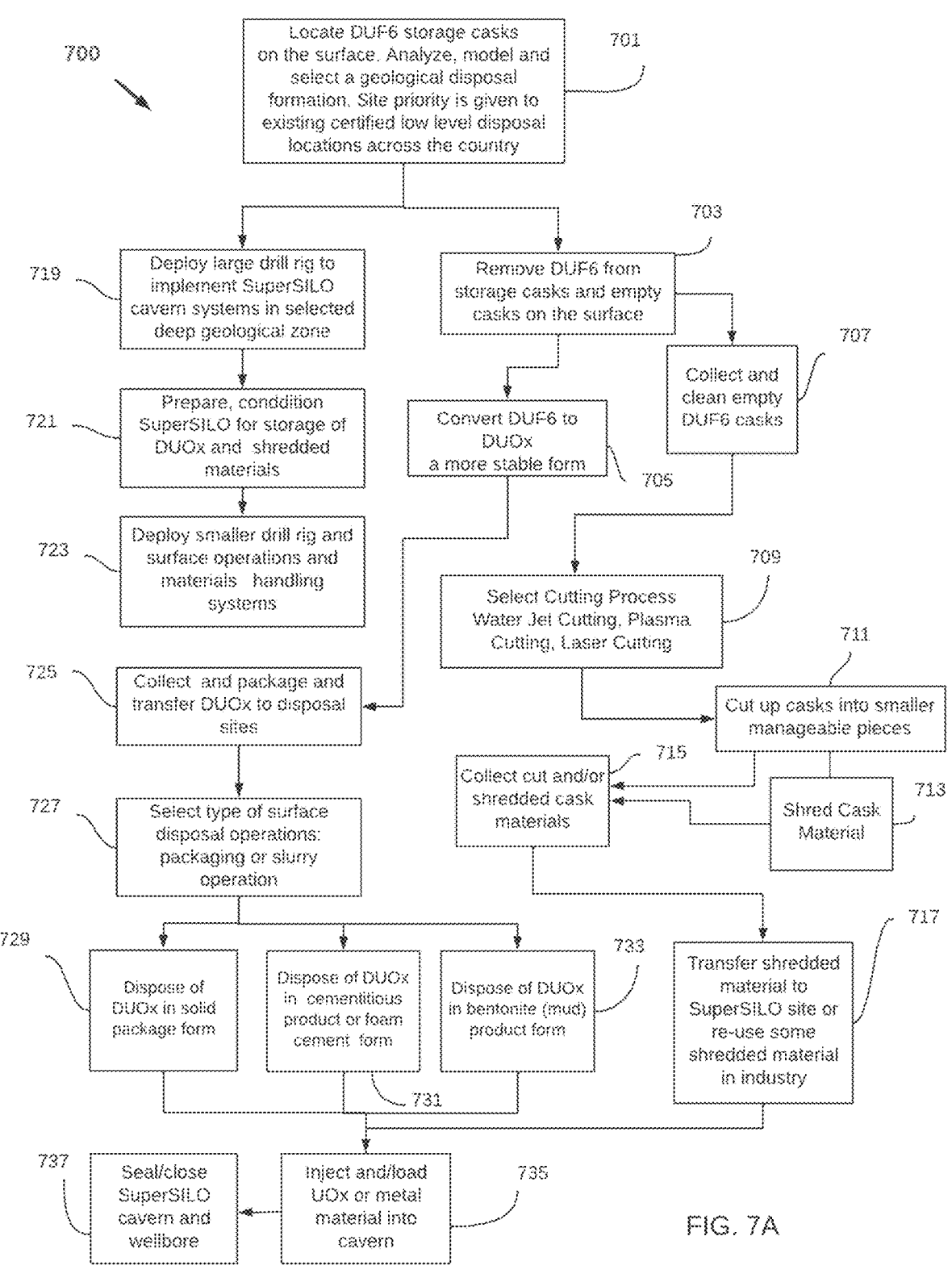
FIG. 7A depicts a flow chart of at least one step in a method of disposing of uranium hexafluoride and the casks used to store uranium hexafluoride.

FIG. 7A may depict a flowchart. FIG. 7A may depict a method 700. FIG. 7A may depict at least some steps of method 700. In some embodiments, method 700 may be a method for disposing of radioactive waste material such as, but not limited to, uranium oxide(s) (DUOx) and/or empty and used casks 105 (or portions thereof) within human-made cavern(s) 203 that are located within deep geologic formations 207. In some embodiments, method 700 may be a method for disposing of DUOx produced/generated from nuclear operations and/or produced from other radioactive sources, within human-made cavern(s) 203 that are located within deep geologic formations 207. In some embodiments, method 700 may be a method of disposing of DUOx and/or empty and used casks 105 (or portions thereof) in at least one (1) human-made cavern 203 that is located within at least one (1) deep geologic formation 207. In some embodiments, the at least one (1) human-made cavern 203 is located entirely within at least one (1) deep geologic formation 207. In some embodiments, method 700 may be a method of disposing of DUOx and/or empty and used casks 105 (or portions thereof) via at least one wellbore(s) 202; wherein a terminal/distal portion the at least one at least one vertical wellbore(s) 202 is located within at least one deep formation 207. In some embodiments, method 700 may be a method of constructing at least one (1) vertical wellbore 202 and of constructing at least one (1) deep human-made cavern 203 that is connected to the at least one (1) vertical wellbore 202, wherein the at least one (1) human-made cavern 203 is located within the deep geologic formation 207, and wherein at least portions of the at least one human-made cavern 203 are configured to receive and to contain at least one unit of DUOx and/or are configured to receive and to contain empty and used casks 105 (or portions thereof). In some embodiments, method 700 may be a method of constructing a human-made cavern 203 in a deep geologic formation 207 to contain at least one unit of DUOx and/or to contain empty and used casks 105 (or portions thereof). In some embodiments, method 700 may be a method of locating, geomechanically modelling, and/or selecting an appropriate a deep geologic formation 207 of appropriate properties needed for efficient disposal of DUOx and/or of empty and used casks 105 (or portions thereof) in human-made cavern(s) 203 that are to be located entirely within that deep geologic formation 207. In some embodiments, method 700 may be a method of "landing" or loading at least one packet of DUOx and/or of landing/loading empty and used casks 105 (or portions thereof) into human-made cavern 203, wherein that human-made cavern 203 is located entirely within deep formation 207.

Continuing discussing FIG. 7A, in some embodiments, method 700 may comprise at least one (or one or more) of the following steps: 701, 703, 705, 707, 709, 711, 713, 715, 717, 719, 721, 723, 727, 729, 731, 733, 735, 737, portions thereof, combinations thereof, and/or the like. In some embodiments, at least one such step may be optional, skipped, and/or repeated. In some embodiments, some such steps may be executed out of numerical order, with respect to the steps reference numerals. In some embodiments, method 700 need not start/begin with step 701. In some embodiments, method 700 may be start/begin with a step other than step 701, such as, but not limited to, step 703, 705, 707, 725, portions thereof, combinations thereof, and/or the like.

Continuing discussing FIG. 7A, in some embodiments, step 701 may be a step of locating the $DUF_6$ storage casks 105 on the surface 206 (or near surface 206); and/or of analyzing/modeling desirable predetermined qualities for a disposal deep geologic formation 207; and/or of selecting at least one disposal deep geologic formation 207 to be used construct at least one human-made cavern 203 therein. In some embodiments, method 700 may begin with step 701. In some embodiments, step 701 may be a step of locating and/or identifying the (intended temporary) $DUF_6$ waste storage casks 105 on the surface 206 and/or near/proximate to surface 206. In addition, in this step 701, the storage casks 105 may be ranked according to the level of deterioration of the casks 105 such that the worst casks 105, i.e., the most seriously corroded/rusted casks 105 are processed first to minimize environmental impact that may be caused by leakage or rupture of the currently existing metal casks 105.

Continuing discussing FIG. 7A, in some embodiments, step 701 may include a process of analytically and/or empirically quantifying and modelling the petrophysical properties and volumetric dimensions of the potential candidate deeply located geologic rock/formation(s) to qualify as deeply located rock/geologic formation(s) 207; and/or to determine if the potential deeply located geologic rock/formation(s) under scrutiny may remain isolated at depth for the hundreds of thousands of years needed to keep the DUOx (uranium oxide) materials (and/or the used and empty casks 105 or portions thereof) sequestered safe from external environments and/or the biosphere. In some embodiments, these analytical means in step 701 may include regional geophysical and current seismic analyses and/or database examinations of such data. In some embodiments, step 701 may allow quantification of both candidate deeply located rock/geologic formation(s) and/or of deeply located rock/geologic formation(s) 207 intrinsic properties which may be important for disposing of DUOx into such deeply located rock/geologic formation(s) 207. In some embodiments, step 701 may comprise simulating, modelling, mathematical modelling, computer modeling, numerical methods, portions thereof, combinations thereof, and/or the like, with respect to the particular candidate deeply located rock/geologic formation(s) under scrutiny. In some embodiments, appropriate deeply located rock/geologic formation(s) 207 may exhibit hydraulic closure thereby minimizing any future chance of the deeply located rock/geologic formation(s) 207 allowing water intrusion and creating radioactive migration problems related to the sequestered DUOx materials located therein. In some embodiments, selection of the appropriate disposal site location(s) above identified appropriate deeply located rock/geologic formation(s) 207 may be selected in step 701. In some embodiments in step 701, a priority selection scheme may be set up such that prospective disposal locations that exist in currently or already certified areas of low level nuclear disposal may be selected first, or at least given priority over other sites, if the site(s) meet all the requirements for optimal disposal. Factors for optimal disposal may comprise one or more of: economics, transport, environmental, demographic, geological, political, portions thereof, combinations thereof, and/or the like. Such priority selection may allow the disposal process to be implemented without having to go through a time consuming and possibly politically adverse process from consumer and other groups. In some embodiments, step 701 may progress to step 703. In some embodiments, step 701 may progress to step 719. In some embodiments, step 701 may progress to step 703 and/or to step 719.

Continuing discussing FIG. 7A, in some embodiments, step 703 may be a step of removing the $DUF_6$ from the casks 105, such as the casks 105 shown in FIG. 1D. In some embodiments, the $DUF_6$ may be removed by mechanically opening the metal casks 105 and extracting the $DUF_6$. In some embodiments, completion of step 703 may result in at least some empty and used casks 105 that had formerly held $DUF_6$. In some embodiments, step 703 may progress to step 705. In some embodiments, step 703 may progress to step 707. In some embodiments, step 703 may progress to step 705 and/or to step 707.

Continuing discussing FIG. 7A, in some embodiments, step 705 may be a step of converting the $DUF_6$ to oxides of uranium (uranium oxides). Such conversion processes are commercially available and have been more fully discussed earlier in this patent application in the background section of this patent application. In some embodiments, step 705 may utilize available chemical/physical and/or industrial processes to convert the radioactive $DUF_6$ to the relatively/comparably benign oxide form. These conversion processes are well known processes in the prior art and are incorporated herein by reference as it fully set forth. The conversion processes may be implemented on site at a specialized operations center and the resulting UOx (uranium oxides) made available for disposal in the methods taught herein. Uranium oxides may be a more desirable form, as compared to $DUF_6$, for long-term disposal/storage. See e.g., FIG. 1B of Table 2 which shows some properties of uranium oxides. In some embodiments, completion of step 705 may progress method 700 to step 725.

Continuing discussing FIG. 7A, in some embodiments, step 707 may be a step of collecting the empty and used casks 105 and then cleaning and/or neutralizing the empty and used casks 105, such as, via station(s) 305 (from FIG. 3). In some embodiments, step 707 may be desired because an empty and used cask 105 may retain as much as 50 lbs. (pounds) (23 Kg [kilograms]) of non-volatile residual material after emptying. After the bulk UF6 is mechanically removed in step 703 from the storage casks 105, in step 707 the now the empty and used casks 105 are cleaned and/or neutralized chemically and mechanically to remove residual and/or trace amounts of $DUF_6$ and/or other particulates, thus leaving the clean, neutralized, empty, and used casks 105, which may further mitigate radiation effects from residual quantities of $DUF_6$. In some cases, air heated autoclaves may be used to vaporize the remaining $DUF_6$ to clean out the used and empty casks 105. In some cases, the remaining $DUF_6$ may be removed by washing with the used and empty casks 105 with water and the resulting aqueous acid solutions may be chemically treated. This may include evaporation and neutralization with lime. In some embodiments, these cleaned, neutralized, empty, and used casks 105 may remain on the surface 206 for later processing (see e.g., FIG. 3) and disposal (see e.g., FIG. 2) as illustrated in this patent application by cutting, shredding, and disposing of the resulting cutup and shredded metal casks 105 pieces. In some embodiments, step 707 may progress to step 709.

Continuing discussing FIG. 7A, in some embodiments, step 709 may be a step of determining and/or selecting one or more (mechanical) means whereby the cleaned, neutralized, empty, and used casks 105 are to be cutup into smaller pieces (see e.g., FIGS. 3, 4, and 6), which may facilitate emplacement into human-made cavern(s) 203. In some embodiments, it is an intention, objective, and/or goal to reduce the large intact cleaned, neutralized, used, and empty metal casks 105 into smaller more manageable sizes of metal. Given the large quantity of metal casks 105, e.g., in the tens of thousands, and given the metal casks 105 heavy wall thickness, such as, up to 1.5 inches in wall thickness of these metal casks 105, it may be necessary and/or desirable to use a reduction operation or reduction means that may be applied to large volume processing operations and also provide overall safety, rapid throughput, and economy of operations. It may also be beneficial to allow for automatic or semi-automatic operations of such processing. In some embodiments, and for these reasons, method 700, at step 709, may select from cutting means of one or more of: high-pressure water jet cutting system (e.g., system 400); plasma cutting, laser cutting, portions thereof, combinations thereof, and/or the like. In some embodiments, execution of step 709 may result in selecting one or more of: high-pressure water jet cutting system (e.g., system 400); plasma cutting, laser cutting, portions thereof, combinations thereof, and/or the like, for cutting up the cleaned, neutralized, used, and empty casks 105 into smaller and more manageable pieces, such as, but not limited to, pieces 605. In some embodiments, after step 709 has selected at least one cutting means, method 700 may progress from step 709 to step 711.

With respect to high-pressure water jet cutting system(s) 400 see e.g., FIG. 4 and its above discussion. High-pressure water jet cutting is an accelerated erosion process within the material that is being cut. In this cutting process, highly pressurized water is "fired" through a ruby or diamond nozzle into a mixing chamber. Working pressures as high as 200,000 psi (pounds per square inch) may be mechanically attained in such processes/systems. This pressure and fluid flow creates a vacuum and draws garnet sand (and/or other predetermined abrasives) from a reservoir of garnet (abrasives), into the high-pressure/high-velocity water stream where the stream is then "fired/directed" at the object that is desired to be cut (e.g., material 423 and/or the cleaned, neutralized, used, and empty casks 105). FIG. 4 may illustrate a high-pressure water jet cutting system 400 that at least some embodiments of the present invention may utilize at step 711. The garnet/sand particles "eat away" at the material 423 causing the effect of erosion to take place at such a high speed and with controlled locational precision that this artificially induced erosion is deemed as cutting. Such waterjet cutting has become an extremely powerful and versatile tool that is used in many industries around the world. No secondary processing of the cut is needed when using high-pressure water jet cutting. Further, high-pressure water jet cutting is a cold-cutting process that may leave a satin smooth edge on the cut.

Plasma cutting is a complex melting process. In plasma cutting operations, a complicated nozzle device creates a jet of ionized gas at temperatures above 20,000 Celsius (° C.) and this jet is used to melt and expel material from the cut.

Operationally, an electric arc is struck between an electrode (cathode) and the workpiece, the object being cut (anode). The electrode is recessed in a water- or air-cooled gas nozzle which constricts the arc causing the narrow, high temperature, high velocity plasma jet to form. When the plasma jet hits the workpiece, recombination takes place and the gas reverts to its normal state, emitting intense heat as it does so. This emitted heat melts the metal, and the gas flow ejects it from the cut. Plasma gases are usually argon, argon/hydrogen, or nitrogen. These inert gases can be replaced by air, but this requires a special electrode of hafnium or zirconium. After the cut, grinding for removal of the heat affected zone and flattening to eliminate distortion from heat are often needed, desired, and/or performed. In some embodiments, plasma cutting as a complex and operationally challenging process may not be appropriate/suitable with respect to cutting up the cleaned, neutralized, used, and empty casks 105. However, in some embodiments, plasma cutting may be used as cutting means with respect to cutting up the cleaned, neutralized, used, and empty casks 105.

Laser cutting uses a high-power laser which is directed through optics and computer numerical control (CNC) to direct the beam onto the material being cut. Typically, the process uses a motion control system to follow a pattern that is being cut in the material. The focused laser beam burns, melts, vaporizes or is blown away by a jet of gas to leave a high-quality surface finished edge. A variety of lasers can be used. Operational problems may arise due to corrosion, plating, and other mechanical issues with the electrodes. Additional problems may also arise due to the type of gas flow. Gas flow may be axial or transverse. Each flow type requires a specific type of gas or gas combination. Finally, the laser generator and external optics need to be cooled during operation. In some embodiments, laser cutting as a complex and operationally challenging process may not be appropriate/suitable with respect to cutting up the cleaned, neutralized, used, and empty casks 105. However, in some embodiments, laser cutting may be used as cutting means with respect to cutting up the cleaned, neutralized, used, and empty casks 105.

Continuing discussing FIG. 7A, in some embodiments, step 711 may be a step of cutting up the cleaned, neutralized, used, and empty casks 105 into smaller pieces (such as, pieces 605), via the selected cutting means, such as, but not limited to, one or more of high-pressure water jet cutting system (e.g., system 400); plasma cutting, laser cutting, portions thereof, combinations thereof, and/or the like. As shown and discussed earlier in FIG. 5 the mostly cylindrical metal casks 105 forms may be cut as described and/or shown in FIG. 5 in a bi-directional or multi-dimensional manner. In some embodiments, an end result (output) of step 711 may smaller junks and/or pieces of the cleaned, neutralized, used, and empty casks 105, such as, but not limited to pieces 605. These smaller objects 605 or sections of the metal container 105 are able to be handled more efficiently, easier, safer, and/or faster in later disposal processes. In some embodiments, completion of at least some of step 711 may allow method 700 to progress to step 713, or to step 715, and/or to both step 713 and step 715.

Continuing discussing FIG. 7A, in some embodiments, step 713 may be a step of mechanically shredding the now smaller sections (e.g., pieces 605) of the metal casks 105 which may be output from step 711. This mechanical shredding process is a relatively well developed and widely known industrial process and is further fully discussed earlier in FIG. 5. In some embodiments, step 713 may be executed by use of one or more shredder(s) 309 (see e.g., FIG. 3 and FIG. 5). In some embodiments, an output of step 713 may be pieces of casks 105 that now even smaller than pieces 605. In some embodiments, completion of at least some shredding during step 713 may permit method 700 to progress to step 715.

In some embodiments, if pieces 605 (from the cutting steps) are small enough for emplacement into human-made cavern(s) 203, via a diameter of vertical-wellbore(s) 202, then step 713 may be omitted and/or skipped.

If some embodiments, if a large enough and powerful enough shredder(s) 309 is employed, then the cutting steps (e.g., steps 709 and 711) may be omitted and/or skipped, and the intact cleaned, neutralized, used, and empty casks 105 may be fed directly into such shredder(s) 309, wherein the shredded outputs are at least substantially (mostly) the same size and/or shape as pieces 605 or smaller. In such embodiments, step 707 may progress directly to step 713.

Continuing discussing FIG. 7A, in some embodiments, step 715 may be a step of collecting outputs from the cutting step 711 (e.g., pieces 605) and/or collecting the outputs from the shredding step 713. In some embodiments, the cutup and/or shredded pieces of formerly intact casks 105 may be stored in readily available intermodal shipping containers and/or freight containers, which are cheap, rugged, standardized, and exist in many types and a number of standardized sizes. In some embodiments, such containers are inexpensively and easily transported via existing trucking means. In some embodiments, in step 715 these metal pieces of formerly intact casks 105 may be (temporarily) stored, packaged, and/or sorted/organized for future transport. In some embodiments, completion of at least some of step 715 may permit method 700 to progress to step 717.

Continuing discussing FIG. 7A, in some embodiments, step 717 may be a decision step. In some embodiments, in step 717 at least some of the collected metal pieces from the cutting step 711 (e.g., pieces 605) and/or collecting the outputs from the shredding step 713 may either be transported to surface 206 location(s) for disposal in below SuperSILO(s) 203 and/or may be re-used (recycled) in other use applications. In some embodiments, in step 717 at least some of the collected metal pieces from the cutting step 711 (e.g., pieces 605) and/or collecting the outputs from the shredding step 713 may be transported to surface 206 location(s) for disposal in below SuperSILO(s) 203. In some embodiments, in step 717 at least some of the collected metal pieces from the cutting step 711 (e.g., pieces 605) and/or collecting the outputs from the shredding step 713 may be re-used (recycled) in other use applications (e.g., as metal feedstock, in other industrial raw product processing, etc.). In either scenario, the cutting and/or shredding outputs are disposed of successfully. In some embodiments, step 717 may progress to step 735.

Continuing discussing FIG. 7A, in some embodiments, step 701 may progress to step 719. In some embodiments, step 719 may be a step of implementing at least one (1) deeply located human-made cavern 203 (SuperSILO 203) within a selected deeply located rock/geologic formation 207 by the utilization of drill rig(s) 201, wellbore forming equipment, underreaming equipment, and associated oilfield equipment 205. In some embodiments, after completing at least one (1) human-made cavern 203, then method 700 may progress to step 721.

Continuing discussing FIG. 7A, in some embodiments, a plurality of human-made caverns 203, at/from multiple surface 206 locations, are implemented, such as, but not limited to, via a rectangular grid system. In some embodiments, this type of plurality of human-made caverns 203 development may be implemented by "walking" the drill rig 201 from one wellsite to other nearby wellsite site locations. In some embodiments, the drill rig 201 may be walked up to 200 feet, +/−50 feet. In some embodiments, this surface 206 grid/pattern may form a farm of SuperSILOs 203 in which this areal concentration of SuperSILOs 203 may allow economies of scale, logistic efficiencies, and still dispose of the large quantities of waste within the same selected deeply located rock/geologic formation 207 since these geological zones may normally extend and cover many tens of square miles of areal extent.

Continuing discussing FIG. 7A, in some embodiments, step 719 may be a step of locating a wellbore site on the earth surface 206. In some embodiments, step 719 may involve geological and geophysical analysis to determine an appropriate subterranean location of host deeply located rock/geologic formation 207. In some embodiments, step 719 may involve implementing (setting up and preparing for drilling operations) drilling rig 201 at the selected site on the earth surface 206. In some embodiments, step 719 may include implementation of surface 206 facilities shown in FIG. 8.

Continuing discussing FIG. 7A, in some embodiments, in step 719, vertical wellbore 202 may be drilled from drilling rig 201 on earth surface 206 to a prescribed (predetermined) vertical depth. In some embodiments, this depth may depth 208 as shown in FIG. 2. In some embodiments, this depth (depth 208) may be from 2,000 to 12,000 feet, +/−1,000 feet, below surface 206. In some embodiments, in step 719, a mostly vertical section of the wellbore 202 may be drilled into host deeply located rock/geologic formation 207 to initiate formation of a top of a given human-made cavern 203. In some embodiments, a reaming device, well known in industry, may be run/implemented in the vertical wellbore 202 and into the downhole vertical section where it may be desired to form a given human-made cavern 203 into host deeply located rock/geologic formation 207. For example, this may involve deploying, extending, and/or activating reaming devices within a distal/terminal portion of vertical-wellbore 202. In some embodiments, step 719 may involve the drilling and implementation of a plurality of separate vertical wellbores 202 and also their connected human-made caverns 203 there below. This multiple drilling operation may be desired, needed, and/or recommended if the UOx (uranium oxides) may be desired or needed to be separately disposed of from the cutup and/or shredded metal materials of formerly intact casks 105. In some operations both UOx and the cutup and/or shredded metal materials of formerly intact casks 105 may be disposed of sequentially in a same human-made cavern 203. In some embodiments, the UOx and the cutup and/or shredded metal materials of formerly intact casks 105 may be disposed of separately in the different human-made caverns 203.

Figure 7C:
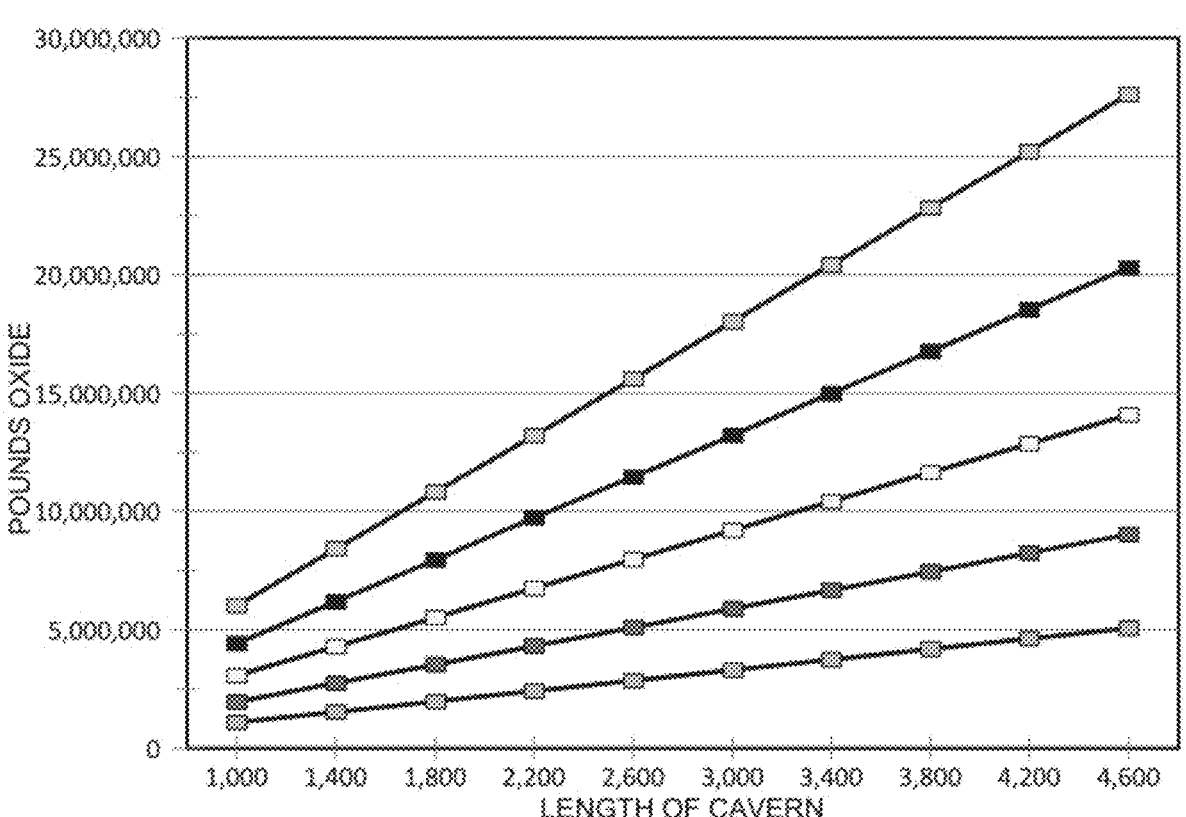
FIG. 7C is a graph/chart that shows waste storage/disposal capacities (in pounds) of human-made caverns of various sizes/dimensions.

Continuing discussing FIG. 7A, in some embodiments, in step 719 the reaming process may continue either directly or sequentially in phases to ream out human-made cavern(s) 203 in host rock 207 to depth 209 from 1,000 feet to 5,000 feet, +/−100 feet, of vertical extent and with (inside) diameters from thirty (30) inches up to 120 inches, +/−five (5) inches. Recall, depth 209 does not even begun until after depth 208, i.e., depth 209 is located directly below depth 208 (see e.g., FIG. 2). A capacity of a given human-made cavern 203 will vary with size in a linear manner with the height/depth of the given human-made cavern 203 and in a non-linear manner with the diameter of the given human-made cavern 203. See e.g., FIG. 7B (of Table 3) and/or FIG. 7C, which shows storage/disposal capacities, in pounds, with respect to human-made caverns 203 of various dimensions/ geometries. FIG. 7B is in tabular format; whereas, FIG. 7C is in a graphical format.

It should be noted that the actual (loadable) human-made cavern 203 waste storage/disposal capacity may be less for a given human-made cavern 203 geometry/dimensions because of the addition of cement or bentonite or additional materials such as additives which when included may decrease the total weight of the wastes to be received into the given human-made cavern 203. Regardless, a single Super-SILO 203 is capable of containing a very large quantity of uranium oxide (and/or cutup and/or shredded formerly intact casks 105). This capacity feature is a major benefit of this invention compared to other disposal means. Furthermore, these human-made cavern 203 systems may be developed on a grid pattern and/or the like surface 206 pattern to provide a concentrated area of a farm of SuperSILOs 203, wherein millions of pounds of uranium oxides wastes (and/or cutup and/or shredded formerly intact casks 105) may be (permanently) disposed of within a concentrated or limited area of surface 206 land.

Continuing discussing FIG. 7A, in some embodiments, step 721 may be a step of preparing the at least one human-made cavern 203 for receiving at least some DUOx and/or for receiving the cutup and/or shredded formerly intact casks 105. In some embodiments, in step 721 the at least one human-made cavern 203 may be evacuated of all (or mostly all) residual wellbore drilling fluids, drilling fluid materials, completion fluids (such as, but not limited to potassium chloride (KCl), and/or any other drilling/formation operations chemicals, which may be residing in the at least one human-made cavern 203 as byproducts from its formation by the drilling process. In some embodiments, this evacuation may be accomplished by several means including circulating compressed air (or another gas or gas mixture) from the surface 206 to push, purge, and clean out residual fluids from the at least one human-made cavern 203. In some embodiments, this evacuation may be accomplished by several means including a pump system to lift the residual wellbore fluids (and/or the like) out of the at least one human-made cavern 203. In some embodiments, the pump system may comprise an electrically driven submersible pump may be routinely used to evacuate the cavern system. In some embodiments, this evacuation may be accomplished by several means, including circulating a gas, using a pump, portions thereof, combinations thereof, and/or the like. In some embodiments, step 721 may progress into step 723.

Continuing discussing FIG. 7A, in some embodiments, in step 721 a given human-made cavern 203 drilled (formed) in step 719 may be cleaned out and/or conditioned internally. In some embodiments, this conditioning process may involve the internal/inside walls, the base, and/or the top of the given human-made cavern 203. In some embodiments, conditioning may be done to seal the given human-made cavern 203 interior surfaces against fluid migration out of from the given human-made cavern 203 area and into the immediately adjacent and surrounding deeply located rock/ geologic formation 207. In some embodiments, the conditioning process in step 721 may be designed to condition cavern interior surfaces with coatings on the human-made cavern 203 interior/inside surfaces, such as its walls, bottom, and/or top. In some embodiments, application of wall material/coatings to human-made cavern 203 interior surfaces may be done by operational means from surface 206 systems with wireline or similar oilfield practices equipment. The types of coatings of human-made cavern 203 internal/ interior wall may comprise: cements, epoxies, ceramics, clays, paints, portions thereof, combinations thereof, and/or the like. In some embodiments, the conditioned human-made cavern 203 may be in a state ready to accept the nuclear waste (and/or other waste) processed on the surface 206.

In some embodiments, step 721 of conditioning human-made cavern 203 interior surfaces with any wall material/ coatings may not be necessary, or may be marginally used, for some types of highly consolidated (i.e., highly impermeable) host rock deeply located rock/geologic formation 207. In some embodiments, step 719 may progress to step 723.

Continuing discussing FIG. 7A, in some embodiments, in step 723, a smaller sized drill rig 201 may be used for future ongoing (e.g., waste loading/emplacement) operations. This change in rig 201 size is an economic benefit and is generally desired since the cost of operating a large heavy-duty rig may be more than twice that of the basic/smaller drill rig 201. Typically, a small drill rig 201 may cost about $15,000/day rate; whereas, the larger drill rig 201 rate may be in excess of $40,000/day depending on rig horsepower. In some embodiments, this selected and/or used smaller rig 201 is usually fully capable of handling the needed disposal operations in disposal such as loading, transferring, landing, and inserting the waste materials into the vertical wellbore 202 and into the human-made cavern(s) 203. In some embodiments, step 723 may progress to step 725.

Continuing discussing FIG. 7A, in some embodiments, in step 723 surface 206 infrastructure desired or needed for physically managing, preparing, and injecting the waste may be implemented on the surface 206 adjacent to a wellhead of vertical wellbore 202 and the (smaller) drill rig 201. This type of surface operation is similar to what is normally done on an oil or gas well drilling operations where cementing, mud handling, logging, fracking, and other operations may be ongoing sequentially at a given site.

Figure 8:
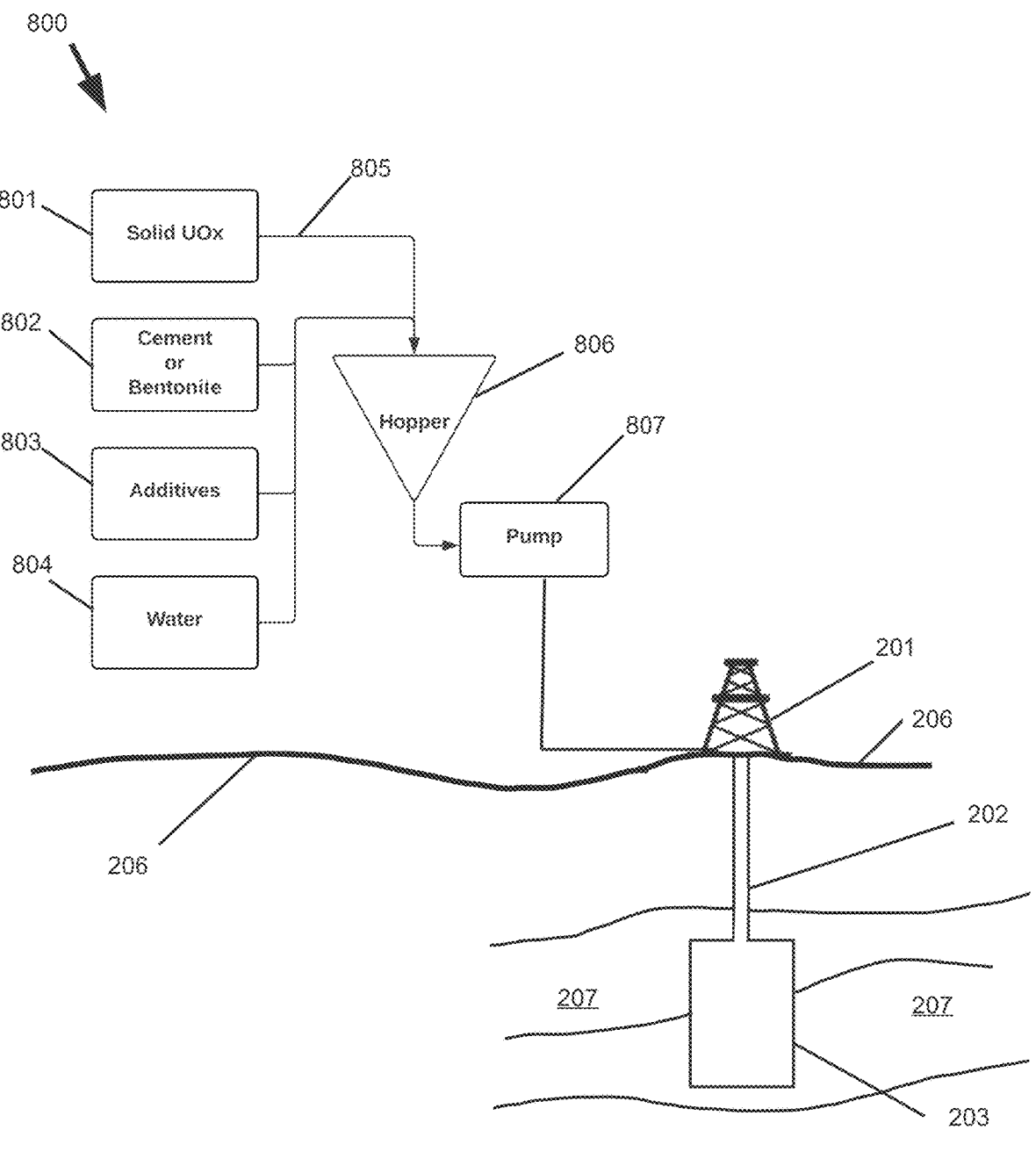
FIG. 8 illustrates a schematic of the surface equipment, components, systems, and/or operations for preparing and/or disposing of uranium oxides (UOx) in various disposal forms within human-made caverns.

Continuing discussing FIG. 7A, in some embodiments, this step 723 may involve the placement of at least some operational components/systems as shown in FIG. 8. For example, and without limiting the scope of the present invention, the placement of temporary local storage equipment 801 for the UOx (uranium oxides) material which is transported to the disposal site. In addition, the placement of storage bins for cement or bentonite products for use in co-injecting the waste into the vertical wellbore(s) 202 and then into the human-made cavern(s) 203. Also placed on/near the wellsite are storage reservoirs for chemical additives 803 and water 804. All these surface components/ systems 801, 802, 803, and/or 804 may be manifolded and connected via pipe systems 805 which may allow real time mixing of desired products at the desired times in the disposal processes.

Continuing discussing FIG. 7A, in some embodiments, step 725 may be a step of receiving UOx (uranium oxides) waste materials from $UF_6$ conversion process (e.g., from step 705). In some embodiments, step 725 may be a step of collecting and packaging the UOx (uranium oxides) waste materials from the original long-term surface 206 storage sites which are usually remote, sometimes as much as 1,000 miles or more, distant from the disposal site and transporting it to the disposal wellsite. This operation may be accomplished by standard truck and/or rail transport means since the $UO_x$ waste is considered and regulated as low-level nuclear waste (LLW) material. In some embodiments, step 725 may progress to step 727.

Continuing discussing FIG. 7A, in some embodiments, step 727 may be a decision/determination step. In some embodiments, in this step 727, a determination may be made about the manner and physical form in which the DUOx waste materials are to be loaded into the human-made cavern(s) 203. In some embodiments, step 727 may select uranium oxide (DUOx) storage/disposal format from one or more of: a solid package disposal form (see e.g., step 729); a cementitious and/or foam package disposal form (see e.g., step 731); a bentonite and/or mud package disposal form (see e.g., step 733); portions thereof; combinations thereof; and/or the like. In some embodiments, step 727 may be a decision step of selecting the type of disposal form/format as solid waste packaging; some slurry system for UOx waste; a bentonite (drilling mud) based composite waste mixture; portions thereof; combinations thereof; and/or the like. The choice of surface operations may depend on some factors such as, but not limited to: economics; material availability; quantity of waste to be disposed; on the environmental impact of the surface operations in the local region; portions thereof; combinations thereof; and/or the like. In some embodiments, it may be contemplated that a remote wide open, sparsely populated region for siting the disposal site, may be cheaper to operate as compared to an urban or semi-urban region. In some embodiments, execution of step 727 may result in selection of one or more of: a solid package disposal form (see e.g., step 729); a cementitious and/or foam package disposal form (see e.g., step 731); a bentonite and/or mud package disposal form (see e.g., step 733); portions thereof; combinations thereof; and/or the like for the disposal form/format of the waste to be loaded/ emplaced within the human-made cavern(s) 203. In some embodiments, step 727 may progress to step 729, step 731, step 733, two of these steps, or all three of these steps. These three steps may occur sequentially or concurrently at the disposal site. Concurrent operations may occur if more than one disposal human-made cavern 203 is being utilized.

Continuing discussing FIG. 7A, in some embodiments, step 729 may be a step of utilizing the solids disposal form/format for disposing of the UOx (uranium oxides) waste (and/or the cutup and/or shredded formerly intact casks 105) within the human-made cavern(s) 203. In some embodiments, the equipment, components, systems, and/or operations for this step 729 may be set up on the surface 206 and illustrated in FIG. 8. In some embodiments, the step 729 solids disposal form/format may be where the wastes to be disposed of are in a substantially (mostly) solid format and/or in a substantially non-liquid, non-fluid, and/or a non-gas format. In some embodiments, the step 729 solids disposal form/format may be a process wherein packets containing solid and/or granulated UOx are loaded into the vertical wellbore(s) 202 and then subsequently deposited into the human-made cavern(s) 203 using a mechanical dump system commonly called a "baler" from surface 206. In some embodiments, mechanical dumping may proceed by allowing the UOx to controllably "flow" (fall) down the vertical wellbore 202 into its associated (terminally con- nected) human-made cavern 203. In some embodiments, step 729 may progress into step 735.

Continuing discussing FIG. 7A, in some embodiments, step 731 may be a step of implementing a cementitious, slurry, and/or a foam disposal form for the UOx (uranium oxides) to be disposed of within the one or more human- made cavern(s) 203. In some embodiments, the cementi- tious, slurry, and/or a foam disposal form may produce viscous pumpable disposal products that may be injected into the vertical wellbore 202 (which may then fall and/or be pumped into the one or more human-made cavern(s) 203). In some embodiments, in step 731 cementitious, slurry, and/or a foam disposal form may be implemented based on "straight" or regular cement slurry or a special "foam" cement slurry which may include foaming agents like air or other gaseous materials. Such cement foaming processes are available in the prior art. In some embodiments, equipment and operations for this cement foaming may be set up on the surface 206 and generally close to (adjacent to/proximate to) the wellhead for a given vertical wellbore 202 and illustrated in FIG. 8. In some embodiments, mechanical pumping of the cementitious (foam) slurry may proceed by allowing cement-UOx slurry/(foam) to be controllably pumped down the vertical wellbore 202 into the human-made cavern(s) 203. In some embodiments, after a prescribed (predeter- mined) time, the cementitious slurry/(foam), with the UOx, sets up/solidifies into a solid mass inside the human-made cavern(s) 203 and is thus isolated from the ecosphere. In some embodiments, step 731 may progress into step 735.

Continuing discussing FIG. 7A, in some embodiments, step 733 may be a step of implementing a bentonite and/or a drilling mud disposal form for the UOx (uranium oxides) to be disposed of within the one or more human-made cavern(s) 203. In some embodiments, the bentonite and/or the drilling mud disposal form may produce viscous pump- able disposal products with a bentonite-uranium oxide mix- ture that may be injected/pumped into the vertical wellbore 202 and subsequently into the one or more human-made cavern(s) 203. In some embodiments, in step 733, a ben- tonite-based product may be implemented based on mixing calculated proportions of bentonite, UOx (uranium oxides), and other products to make a pumpable mixture. In some embodiments, equipment for this process may be set up on the surface 206 and generally close to (adjacent to/proximate to) the wellhead for a given vertical wellbore 202 and illustrated in FIG. 8. In some embodiments, bentonite may have additional physical and/or chemical properties that make it a valuable and effective means of disposing of the UOx waste. In some embodiments, these specific bentonite properties may comprise one or more: high fluid viscosity; thixotropic properties; low viscosity while flowing but high viscosity and stable gel formation when static; radionuclide absorption; inexpensive and widely available worldwide because of the large oil and gas industry which uses millions of pounds of bentonite annually; portions thereof; combi- nations thereof; and/or the like. In some embodiments, mechanical pumping of the bentonite-UOx mixture may proceed by allowing bentonite-UOx mixture to controllably be pumped down the vertical wellbore 202 into the human- made cavern(s) 203. In some embodiments, after a pre- scribed (predetermined) passage of time, the bentonite-UOx mixture gels/sets up into a highly stable long-lived gelati- nous mass inside the human-made cavern(s) 203 and is thus isolated from the ecosphere. In some embodiments, step 733 may progress to step 735.

Continuing discussing FIG. 7A, in some embodiments, step 735 may be a step of loading, injecting, pumping, placing, putting, emplacing, portions thereof, combinations thereof, and/or the like of the UOx (uranium oxides) waste materials and/or of the cutup and/or shredded formerly intact casks 105 into one or more vertical wellbore(s) 202 and then subsequently into the one or more human-made cavern(s) 203. In some embodiments, UOx (uranium oxides) waste materials to be loaded in step 735 may be of one or more of the following three (3) disposal forms: the solid UOx form (see e.g., step 729); the cementitious, slurry, and/or the foam disposal form (see e.g., step 731); the blended bentonite or the drilling mud disposal form (see e.g., step 733); portions thereof; combinations thereof; and/or the like. In some embodiments, the cutup and/or shredded formerly intact casks 105 and the UOx waste materials may be disposed of in the same or separate/different human-made cavern/s 203. In some embodiments, drill rig 201 may be used for step 735 operations and/or along with pump 807 or the like. In some embodiments, when a predetermined amount, quantity, and/or volume of waste has been loaded into a given human-made cavern 203 via execution of step 735, then method 700 may progress to step 737.

Continuing discussing FIG. 7A, in some embodiments, step 737 may be a step of sealing off the emplaced waste materials (e.g., the uranium oxides and/or the cutup and/or shredded formerly intact casks 105) inside of the given human-made cavern 203. In some embodiments, step 737 may be a closure step of the vertical wellbore 202/human-made cavern 203 system. In some embodiments, in step 737 one or more wellbore plug(s) 210 may be deposited within the at least one vertical wellbore 202, with an intention to permanently and/or completely closing off and/or sealing off that the at least one vertical wellbore 202. In some embodiments, these cement plug(s) 210 may be several hundred to several thousand feet in vertical extent and provide a maximum sealing effect against wellbore flow (+/−100 feet) between (a top of) the human-made cavern 203 and the surface 206. In some embodiments, the one or more cement plug(s) 210 may be of one or more predetermined cements and/or cementitious materials. In some embodiments, the one or more plug(s) 210 may be inserted, deposited, landed, and/or pumped in-to place within the at least one vertical wellbore 202 by use of drilling rig 201 from surface 206. In some embodiments, completion of step 737 may result in completion of method 700 for that given vertical wellbore 202/human-made cavern 203 system (e.g., as shown in FIG. 2); however, that overall surface 206 site may have other vertical wellbore 202/human-made cavern 203 systems under various stages of operation of method 700.

Continuing discussing FIG. 7A, in some embodiments, a group of steps 703, 707, 709, 711, 713, 715, and/or 717 may be independent of another/different group of steps 719, 721, 723, 725, 727, 729, 731, and/or 733; such that these two groups may occur independently of each other; concurrently (simultaneously) with each other; partially overlapping with each other; occurring at different times from each other; portions thereof; combinations thereof; and/or the like. However, step 725 may depend from steps 723 (or from step 721) and step 705 (or of receiving uranium oxides). In some embodiments, step 719 and/or step 703 may depend from step 701. In some embodiments, step 735 may depend from steps 729, 731, 733, and/or step 717.

Figure 7D:
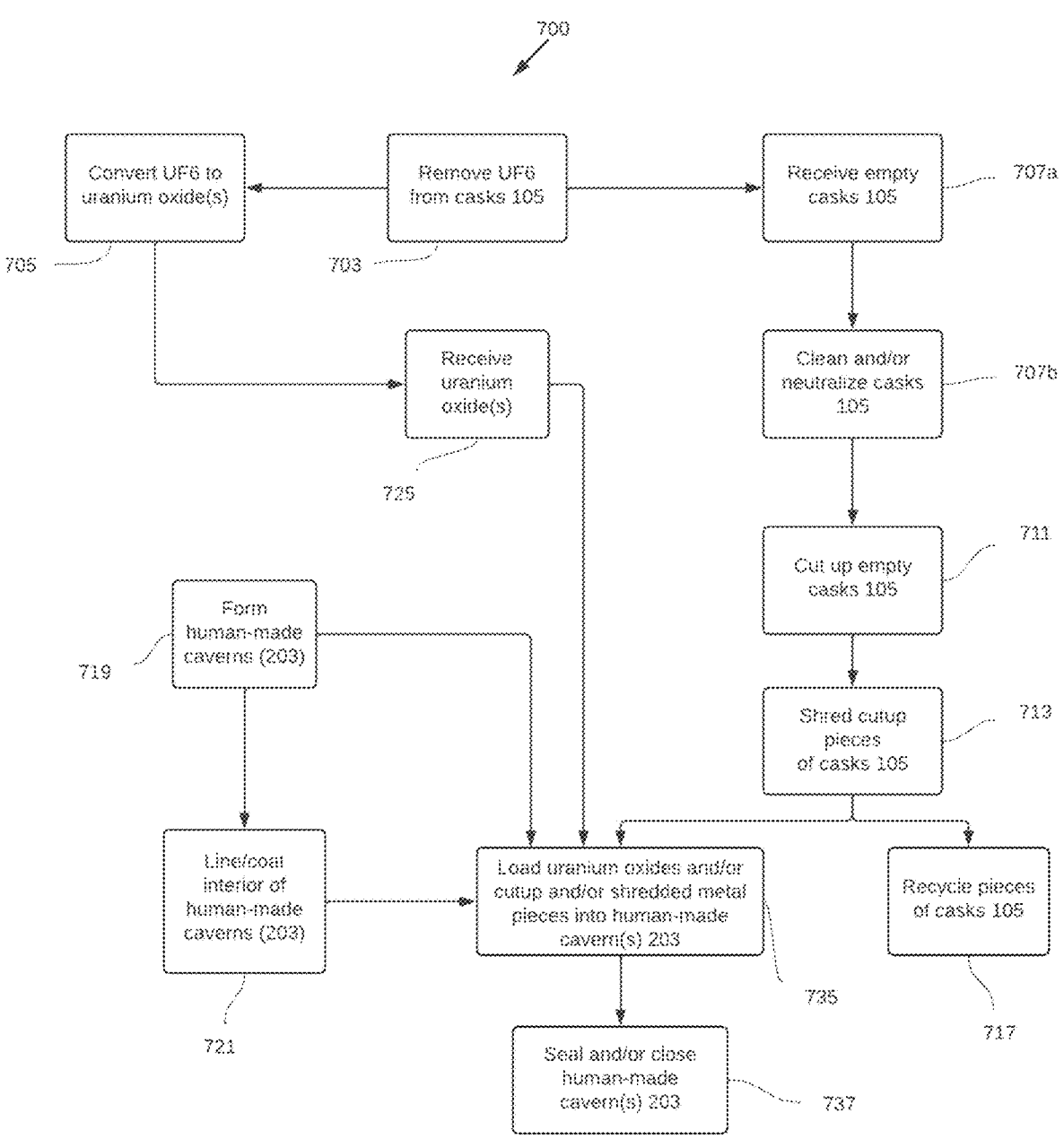
FIG. 7D is a flowchart of a method that may summarize the method of FIG. 7A and/or that may characterize this method from a different perspective as compared to how this method is portrayed in FIG. 7A.

FIG. 7D is a flowchart of method 700 that summarizes method 700 and/or characterizes method 700 in different manner as compared to FIG. 7A. In some embodiments, method 700 of FIG. 7A and of FIG. 7D may be complimentary to each other or may be alternatives to each other. Some embodiments of the present invention may be characterized as a method of disposing of uranium oxides and of processing metal casks 150 that had formerly held uranium hexafluoride. See e.g., method 700 of FIG. 7D (and/or of FIG. 7A). In some embodiments, this method 700 may comprise steps of: step 725, step 707, step 711/713, and step 735. In some embodiments, step 725 may be a step of receiving at least a quantity of at least one type of uranium oxide. In some embodiments, the at least one type of uranium oxide may be at least substantially uranium dioxide (UO$_2$). In some embodiments, the at least one type of uranium oxide may be selected from one or more of: uranium dioxide (UO$_2$); UO$_2$ in aggregate form; UO$_2$ in sintered form; UO$_2$ powder; UO$_3$ powder; or U$_3$O$_8$. Note, in FIG. 7D, step 707 from FIG. 7A is broken down in step 707$a$ and 707$b$. In some embodiments, step 707$a$ may be a step of receiving at least one metal cask 105 selected from the metal casks 105 that was formerly housing at least some quantity of the uranium hexafluoride. In some embodiments, step 711/713 may be a step of cutting up and/or shredding the at least one metal cask 105 into smaller pieces (such as, but not limited to, smaller pieces 605). These smaller pieces are the cutup and/or shredded components of the formerly intact casks 105. In some embodiments, step 735 may be a step of loading at least some of the quantity of the at least one type of uranium oxide and/or of loading at least some of the smaller pieces into one or more human-made caverns 203. In some embodiments, the one or more human-made caverns 203 may be located within at least one deeply located geologic formation 207. In some embodiments, the at least one deeply located geologic formation 207 may be located at least 2,000 feet vertically below a terrestrial surface 206 of the Earth. In some embodiments, at least some of the smaller pieces (of the formerly intact casks 105) may be recycled to serve as metal raw material in one or more industrial applications (see e.g., step 717).

Continuing discussing FIG. 7D, in some embodiments, prior to the step 725 and prior to the step 707 (e.g., step 707$a$ and/or step 707$b$) method 700 may comprise a step 703 of removing most of the quantity of the uranium hexafluoride from the at least one metal cask 105. In some embodiments, the removed uranium hexafluoride may be converted into the at least the quantity of the at least one type of uranium oxide. In some embodiments, method 700 may comprise the conversion step 705, i.e., converting from the removed uranium hexafluoride to the at least the quantity of the at least one type of uranium oxide.

Continuing discussing FIG. 7D, in some embodiments, prior to the step 711/713, method 700 may further comprise a step 707$b$ of cleaning the at least one metal cask 105 (see e.g., cleaning station(s) 305). In some embodiments, the step 711 cutting may be done by at least one high-pressure water jet cutting system (see e.g., system 400) (see e.g., step 709, step 711, and/or cutting station(s) 307). In some embodiments, the step 711 cutting may be done by one or more of: a high-pressure water jet cutting system (see e.g., system 400), a plasma cutting system, a laser cutting system, portions thereof, combinations thereof, and/or the like (see e.g., step 709, step 711, and/or cutting station(s) 307). In some embodiments, the step 713 shredding may be done by at least one shredding station 309 that may be configured to shred steel plating that is 1.5 inches thick, plus or minus 0.1 inch. In some embodiments, the step 711 cutting may occur before the step 713 shredding and outputs from the step 711 cutting may be fed as inputs into the step 713 shredding (see e.g., step 711, step 713, and FIG. 3).

Continuing discussing FIG. 7D, in some embodiments, with respect to the step 735, the at least the quantity of the at least one type of uranium oxide and the at least some of the smaller pieces may be loaded into a same human-made cavern 203 selected from the one or more human-made caverns 203. In some embodiments, with respect to the step 735, the at least the quantity of the at least one type of uranium oxide and the at least some of the smaller pieces may be loaded into at least two (2) different human-made caverns 203 selected from the one or more human-made caverns 203; such that, one of these human-made caverns 203 may house the at least the quantity of the at least one type of uranium oxide and the other of these human-made caverns 203 may house the at least some of the smaller pieces.

Continuing discussing FIG. 7D, in some embodiments, the at least the quantity of the at least one type of uranium oxide that may be loaded into the one or more human-made caverns 203 in the step 735 may be in a (particular and predetermined) disposal form (see e.g., step 727, step 729, step 731, and/or step 733). In some embodiments, the at least the quantity of the at least one type of uranium oxide that may be loaded into the one or more human-made caverns 203 in the step 735 may be in (particular and predetermined) solid disposal form that is designated as a solid disposal form (see e.g., step 727 and step 729). In some embodiments, the at least the quantity of the at least one type of uranium oxide that may be loaded into the one or more human-made caverns 203 in the step 735 may be in (particular and predetermined) disposal form that is designated as, a cementitious, slurry, and/or a foam disposal form (see e.g., step 727 and step 731). In some embodiments, the at least the quantity of the at least one type of uranium oxide that may be loaded into the one or more human-made caverns 203 in the step 735 may be in (particular and predetermined) disposal form designated as a bentonite or a drilling mud disposal form (see e.g., step 727 and step 733).

Continuing discussing FIG. 7D, in some embodiments, prior to method 700 executing the step 735, method 700 may comprise a step 719 of forming the one or more human-made caverns 203 within the at least one deeply located geologic formation 207 by use of at least one: drilling rig 201, wellbore drilling equipment, and underreaming equipment (see e.g., step 719, step 721, step 723, and FIG. 2). In some embodiments, prior to method 700 executing the step 735, method 700 may comprise a step 719 of lining/coating at least some interior surfaces of the one or more human-made caverns 203 with a coating that is configured to make such lined interior surfaces water impermeable (see e.g., step 719, step 721, and FIG. 2). In some embodiments, such lining/coating may be optional and/or skipped as deeply located geologic formation 207 may already be substantially impenetrable to water intrusion, at least in the vicinity of deeply located geologic formation 207 that is proximate to, next to, adjacent to, and/or touching, human-made cavern 203.

FIG. 8 may depict surface 206 equipment, components, systems, and/or operations 800 used in the disposal of the uranium oxide waste disposal forms into one or more human-made cavern(s) 203. In some embodiments, FIG. 8 may show the operational apparatus 800 for disposing of radioactive waste material (such as, but not limited to, DUOx) within human-made cavern(s) 203. In some embodiments, the surface 206 equipment, components, systems, and/or operations 800 may comprise one or more of: storage/bin 801, storage/bin 802, storage/bin 803, storage/bin 804, connecting material flow line(s) 805, hopper 805, pump 807, drill rig 201, portions thereof, combinations thereof, and/or the like. In some embodiments, FIG. 8 shows at least some surface 206 containers generally called "bins" in which solid and/or liquid/fluid material may be stored until disposal operations are in execution. In some embodiments, storage 801 may store the UOx in solid forms, such as, but not limited to, granular, sintered forms, aggregate forms, brick/block forms, cake forms, powder form, portions thereof, combinations thereof, and/or the like. In some embodiments, storage 801 may be in the form of bulk bag 107 and/or the like. In some embodiments, storage 802 may be configured for storing cements, slurries, cement products, bentonite, drilling mud, foaming agents, portions thereof, combinations thereof, and/or the like. In some embodiments, storage 802 may be configured to store cement and cement products which may be available for mixing the cementitious material for injecting and/or pumping into the Super-SILO 203. In some embodiments, storage 803 may be configured to store chemical additives such as, but not limited to, emulsifiers, friction reducers, setting agents, foaming agents, or various chemicals which may aid in effective pumping of the cementitious/slurry/(foam) and/or bentonite mixtures containing the UOx. In some embodiments, storage 804 may be a reservoir configured for holding water.

Continuing discussing FIG. 8, in some embodiments, line(s) 805 may be a manifold system of pipes which may controllably allow the various materials in storage(s) 801 to 804 to be co-mingled and forwarded to be mixed in the hopper 806. In some embodiments, hopper 806 may be a typical surface 206 equipment generally used in the oilwell industry for controllably blending and mixing products like cement and drilling mud components. In some embodiments, exiting/leaving hopper 806, usually under gravity, the mixture of waste materials may enter pump 807 to be pumped to the wellhead location (such as at/below drill rig 201) and then these waste materials, sometimes via pump 807 and/or via gravity, may be further pumped downward into the vertical wellbore 202; wherein exiting/leaving the bottom of the vertical wellbore 202 the pumped or disposed waste materials enters the given human-made cavern 203 for final/permanent disposal therein. In some embodiments, this type of surface 206 operation(s) 800 may be (scaled) increased or decreased in physical size and/or throughput capacity, as larger or smaller footprints of machines and pumping systems may be enlarged to meet disposal demands of the UOx and/or of the cutup and/or shredded formerly intact casks 105. Note in FIG. 8, components 801 through and including 807 are located vertically above and/or at surface 206, but are not necessarily located vertically above drill rig 201.

Some embodiments of the present invention may be characterized as a method of disposing of uranium oxides and of processing metal casks 150 that had formerly held uranium hexafluoride. See e.g., method 700 and/or FIG. 7A. In some embodiments, this method may comprise steps of: step (a), step (b), step (c), and step (d). In some embodiments, step (a) may be a step of receiving at least a quantity of at least one type of uranium oxide (see e.g., step 705 and/or step 725). In some embodiments, the at least one type of uranium oxide may be at least substantially uranium dioxide ($UO_2$). In some embodiments, the at least one type of uranium oxide may be selected from one or more of: uranium dioxide ($UO_2$); $UO_2$ in aggregate form; $UO_2$ in sintered form; $UO_2$ powder; $UO_3$ powder; or $U_3O_8$. In some embodiments, step (b) may be a step of receiving at least one metal cask 105 selected from the metal casks 105 that was formerly housing at least some quantity of the uranium hexafluoride (see e.g., step 701 and/or step 703). In some embodiments, step (c) may be a step of cutting up and/or shredding the at least one metal cask 105 into smaller pieces (such as, but not limited to, smaller pieces 605) (see e.g., step 709, step 711, and/or step 713). These smaller pieces are the cutup and/or shredded components of the formerly intact casks 105. In some embodiments, step (d) may be a step of loading at least some of the quantity of the at least one type of uranium oxide and/or of loading at least some of the smaller pieces into one or more human-made caverns 203. In some embodiments, the one or more human-made caverns 203 may be located within at least one deeply located geologic formation 207. In some embodiments, the at least one deeply located geologic formation 207 may be located at least 2,000 feet vertically below a terrestrial surface 206 of the Earth. In some embodiments, at least some of the smaller pieces (of the formerly intact casks 105) may be recycled to serve as metal raw material in one or more industrial applications (see e.g., step 717).

In some embodiments, prior to the step (a) and prior to the step (b) this method may comprise a step of removing most of the quantity of the uranium hexafluoride from the at least one metal cask 105 (see e.g., step 703). In some embodiments, the removed uranium hexafluoride may be converted into the at least the quantity of the at least one type of uranium oxide (see e.g., step 705). In some embodiments, this method may comprise the conversion step, from the removed uranium hexafluoride to the at least the quantity of the at least one type of uranium oxide.

In some embodiments, prior to the step (c), this method may further comprise a step of cleaning the at least one metal cask 105 (see e.g., step 707 and see cleaning station(s) 305). In some embodiments, the step (c) cutting may be done by at least one high-pressure water jet cutting system (see e.g., system 400) (see e.g., step 709, step 711, and/or cutting station(s) 307). In some embodiments, the step (c) cutting may be done by one or more of: a high-pressure water jet cutting system (see e.g., system 400), a plasma cutting system, a laser cutting system, portions thereof, combinations thereof, and/or the like (see e.g., step 709, step 711, and/or cutting station(s) 307). In some embodiments, the step (c) shredding may be done by at least one shredding station 309 that may be configured to shred steel plating that is 1.5 inches thick, plus or minus 0.1 inch. In some embodiments, the step (c) cutting may occur before the step (c) shredding and outputs from the step (c) cutting may be fed as inputs into the step (c) shredding (see e.g., step 711, step 713, and FIG. 3).

In some embodiments, with respect to the step (d), the at least the quantity of the at least one type of uranium oxide and the at least some of the smaller pieces may be loaded into a same human-made cavern 203 selected from the one or more human-made caverns 203. In some embodiments, with respect to the step (d), the at least the quantity of the at least one type of uranium oxide and the at least some of the smaller pieces may be loaded into at least two different human-made caverns 203 selected from the one or more human-made caverns 203; such that, one of these human-made caverns 203 may house the at least the quantity of the at least one type of uranium oxide and the other of these human-made caverns 203 may house the at least some of the smaller pieces.

In some embodiments, the at least the quantity of the at least one type of uranium oxide that may be loaded into the one or more human-made caverns 203 in the step (d) may be in a (particular and predetermined) disposal form (see e.g., step 727, step 729, step 731, and/or step 733). In some embodiments, the at least the quantity of the at least one type of uranium oxide that may be loaded into the one or more human-made caverns 203 in the step (d) may be in (particular and predetermined) solid disposal form that is designated as a solid disposal form (see e.g., step 727 and step 729). In some embodiments, the at least the quantity of the at least one type of uranium oxide that may be loaded into the one or more human-made caverns 203 in the step (d) may be in (particular and predetermined) disposal form that is designated as, a cementitious, slurry, and/or a foam disposal form (see e.g., step 727 and step 731). In some embodiments, the at least the quantity of the at least one type of uranium oxide that may be loaded into the one or more human-made caverns 203 in the step (d) may be in (particular and predetermined) disposal form designated as a bentonite or a drilling mud disposal form (see e.g., step 727 and step 733).

In some embodiments, prior to the method executing the step (d), the method may comprise a step of forming the one or more human-made caverns 203 within the at least one deeply located geologic formation 207 by use of at least one: drilling rig 201, wellbore drilling equipment, and under-reaming equipment (see e.g., step 719, step 721, step 723, and FIG. 2). In some embodiments, prior to the method executing the step (d), the method may comprise a step of lining at least some interior surfaces of the one or more human-made caverns 203 with a coating that is configured to make such lined interior surfaces water impermeable (see e.g., step 719, step 721, and FIG. 2).

In some embodiments, the cutting means (e.g., cutter station(s) 307 and/or high-pressure water jet cutting system 400) and/or the shredding means (e.g., shredder station(s) 309) for processing the empty and used casks 105 may be augmented by a compacting/crushing means, such as one or more compactors/crushers (e.g., using hydraulic rams/pistons) that may be configured to compact/crush the cutup and/or shredded formerly intact empty and used casks 105 into smaller form factors and/or to compact/crush the intact empty and used casks 105 into smaller form factors.

In some embodiments, the cutting means (e.g., cutter station(s) 307 and/or high-pressure water jet cutting system 400) and/or the shredding means (e.g., shredder station(s) 309) for processing the empty and used casks 105 may be replaced by a compacting/crushing means, such as one or more compactors/crushers (e.g., using hydraulic rams/pistons) that may be configured to compact/crush the intact empty and used casks 105 into smaller form factors.

Devices, apparatus, machines, systems, and methods for the long-term and/or permanent disposal of (depleted) uranium hexafluoride and its surface holding casks have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of disposing of uranium oxides and of processing metal casks that had formerly held uranium hexafluoride, wherein the method comprises steps of:
   (a) receiving at least a quantity of at least one type of uranium oxide;
   (b) receiving at least one metal cask selected from the metal casks that was formerly housing at least some quantity of the uranium hexafluoride;
   (c) cutting up and/or shredding the at least one metal cask into smaller pieces; wherein prior to the step (c), the method further comprises a step of cleaning the at least one metal cask;

(d) loading at least some of the quantity of the at least one type of uranium oxide and/or loading at least some of the smaller pieces into one or more human-made caverns, wherein the one or more human-made caverns are located within at least one deeply located geologic formation, wherein the at least one deeply located geologic formation is located at least 2,000 feet vertically below a terrestrial surface of the Earth.

2. The method according to claim 1, wherein the at least one metal cask has a substantially cylindrical shape.

3. The method according to claim 1, wherein the at least one metal cask has a wall thickness of 1.5 inches, plus or minus 0.1 inch in at least some location on the at least one metal cask.

4. The method according to claim 1, wherein a source of the uranium hexafluoride and/or a source of the uranium oxides is from at least one depleted uranium source.

5. The method according to claim 1, wherein the at least one type of uranium oxide is at least substantially uranium dioxide ($UO_2$).

6. The method according to claim 1, wherein the at least one type of uranium oxide is selected from one or more of: uranium dioxide ($UO_2$); $UO_2$ in aggregate form; $UO_2$ in sintered form; $UO_2$ powder; $UO_3$ powder; or $U_3O_8$.

7. The method according to claim 1, wherein prior to the step (a) and prior to the step (b) the method comprises a step of removing most of the quantity of the uranium hexafluoride from the at least one metal cask.

8. The method according to claim 7, wherein the removed uranium hexafluoride is converted into the at least the quantity of the at least one type of uranium oxide.

9. The method according to claim 8, wherein the method comprises the conversion from the removed uranium hexafluoride to the at least the quantity of the at least one type of uranium oxide.

10. The method according to claim 1, wherein the step (c) cutting is done by at least one high-pressure water jet cutting system.

11. The method according to claim 1, wherein the step (c) cutting is done by one or more of: a high-pressure water jet cutting system, a plasma cutting system, or a laser cutting system.

12. The method according to claim 1, wherein the step (c) shredding is done by at least one shredding station that is configured to shred steel plating that is 1.5 inches thick, plus or minus 0.1 inch.

13. The method according to claim 1, wherein the step (c) cutting occurs before the step (c) shredding and outputs from the step (c) cutting are fed as inputs into the step (c) shredding.

14. The method according to claim 1, wherein the at least the quantity of the at least one type of uranium oxide and the at least some of the smaller pieces are loaded into a same human-made cavern selected from the one or more human-made caverns.

15. The method according to claim 1, wherein the at least the quantity of the at least one type of uranium oxide and the at least some of the smaller pieces are loaded into at least two different human-made caverns selected from the one or more human-made caverns.

16. The method according to claim 1, wherein the at least the quantity of the at least one type of uranium oxide that is loaded into the one or more human-made caverns in the step (d) is in a solid disposal form.

17. The method according to claim 1, wherein the at least the quantity of the at least one type of uranium oxide that is loaded into the one or more human-made caverns in the step (d) is in a cementitious, slurry, and/or a foam disposal form.

18. The method according to claim 1, wherein the at least the quantity of the at least one type of uranium oxide that is loaded into the one or more human-made caverns in the step (d) is in a bentonite or a drilling mud disposal form.

19. The method according to claim 1, wherein some of the smaller pieces are recycled to serve as metal raw material in an industrial application.

20. The method according to claim 1, wherein prior to the method executing the step (d), the method comprises a step of forming the one or more human-made caverns within the at least one deeply located geologic formation by use of at least one: drilling rig, wellbore drilling equipment, and underreaming equipment.

21. The method according to claim 20, wherein prior to the method executing the step (d), the method comprises a step of lining at least some interior surfaces of the one or more human-made caverns with a coating that is configured to make such lined interior surfaces water impermeable.

22. A method of disposing of uranium oxides and of processing metal casks that had formerly held uranium hexafluoride, wherein the method comprises steps of:

(a) receiving at least a quantity of at least one type of uranium oxide;

(b) receiving at least one metal cask selected from the metal casks that was formerly housing at least some quantity of the uranium hexafluoride;

(c) cutting up and shredding the at least one metal cask into smaller pieces; wherein the step (c) cutting occurs before the step (c) shredding and outputs from the step (c) cutting are fed as inputs into the step (c) shredding;

(d) loading at least some of the quantity of the at least one type of uranium oxide and/or loading at least some of the smaller pieces into one or more human-made caverns, wherein the one or more human-made caverns are located within at least one deeply located geologic formation, wherein the at least one deeply located geologic formation is located at least 2,000 feet vertically below a terrestrial surface of the Earth.

23. A method of disposing of uranium oxides and of processing metal casks that had formerly held uranium hexafluoride, wherein the method comprises steps of:

(a) receiving at least a quantity of at least one type of uranium oxide;

(b) receiving at least one metal cask selected from the metal casks that was formerly housing at least some quantity of the uranium hexafluoride;

(c) cutting up and/or shredding the at least one metal cask into smaller pieces; wherein some of the smaller pieces are recycled to serve as metal raw material in an industrial application;

(d) loading at least some of the quantity of the at least one type of uranium oxide and/or loading at least some of the smaller pieces into one or more human-made caverns, wherein the one or more human-made caverns are located within at least one deeply located geologic formation, wherein the at least one deeply located geologic formation is located at least 2,000 feet vertically below a terrestrial surface of the Earth.

* * * * *